(12) United States Patent
Wang et al.

(10) Patent No.: US 11,757,601 B2
(45) Date of Patent: *Sep. 12, 2023

(54) USER EQUIPMENT, BASE STATION AND WIRELESS COMMUNICATION METHOD

(71) Applicant: Panasonic Intellectual Property Corporation of America, Torrance, CA (US)

(72) Inventors: Lilei Wang, Beijing (CN); Hidetoshi Suzuki, Kanagawa (JP); Tetsuya Yamamoto, Kanagawa (JP)

(73) Assignee: Panasonic Intellectual Property Corporation of America, Torrance, CA (US)

( * ) Notice: Subject to any disclaimer, the term of this patent is extended or adjusted under 35 U.S.C. 154(b) by 99 days.

This patent is subject to a terminal disclaimer.

(21) Appl. No.: 17/668,232

(22) Filed: Feb. 9, 2022

(65) Prior Publication Data

US 2022/0271906 A1     Aug. 25, 2022

Related U.S. Application Data

(63) Continuation of application No. 16/962,779, filed as application No. PCT/CN2018/076806 on Feb. 14, 2018, now Pat. No. 11,283,583.

(51) Int. Cl.
    *H04L 5/00*            (2006.01)
    *H04W 72/1268*      (2023.01)
    *H04W 72/23*         (2023.01)

(52) U.S. Cl.
    CPC ............ *H04L 5/0098* (2013.01); *H04L 5/001* (2013.01); *H04L 5/0042* (2013.01);
(Continued)

(58) Field of Classification Search
    CPC ... H04L 5/0092; H04L 1/1642; H04L 5/0098; H04L 5/001; H04L 5/0042; H04L 5/0053;
(Continued)

(56) References Cited

U.S. PATENT DOCUMENTS

2018/0183551 A1*  6/2018  Chou ................. H04W 74/006
2018/0288746 A1* 10/2018  Zhang ................ H04L 1/0031
2020/0358584 A1* 11/2020  Baldemair ........... H04L 5/0094

OTHER PUBLICATIONS

Huawei, HiSilicon, "On BWP switching time," R4-1800419, Agenda Item: 4.2.1.4 3GPP TSG-RAN WG4 Meeting AR-1801, San Diego, U.S., Jan. 22-26, 2018. (4 pages).

(Continued)

*Primary Examiner* — Hardikkumar D Patel
(74) *Attorney, Agent, or Firm* — Seed IP Law Group LLP

(57) ABSTRACT

Provided are a user equipment, base station and wireless communication methods related to resource determination for UCI in case of BWP switching in NR. A user equipment comprises: a receiver operative to receive, from a base station in a slot, a Downlink Control Information (DCI) for Bandwidth Part (BWP) switching from a first BWP to a second BWP; circuitry operative to drop a Uplink Control Information (UCI) to be transmitted in a BWP switching period of the first BWP, and to determine the earliest available slot of the second BWP or a third BWP, the BWP switching period being from the slot where the DCI for BWP switching is received until starting the second BWP to which the first BWP is switched according to the DCI; and a transmitter operative to transmit the dropped UCI in the determined earliest available slot of the second BWP or the third BWP to the base station.

12 Claims, 15 Drawing Sheets

(52) U.S. Cl.
CPC ....... *H04L 5/0053* (2013.01); *H04W 72/1268* (2013.01); *H04W 72/23* (2023.01)

(58) Field of Classification Search
CPC ... H04L 1/1854; H04L 1/1896; H04L 1/1861; H04L 5/0055; H04L 5/006; H04W 72/042; H04W 76/27; H04W 80/02; H04W 76/14; H04W 72/1268; H04W 72/1289
See application file for complete search history.

(56) References Cited

OTHER PUBLICATIONS

International Search Report of PCT application No. PCT/CN2018/076806, dated Nov. 19, 2018. (2 pages).
Nokia, Nokia Shanghai Bell, "On remaining details of BWPs," Agenda Item: 7.3.4.1, R1-1800552, 3GPP TSG-RAN WG1 Meeting NR1801, Vancouver, Canada, Jan. 22-26, 2018. (6 pages).

\* cited by examiner

USER EQUIPMENT, BASE STATION AND WIRELESS COMMUNICATION METHOD

BACKGROUND

1. Technical Field

The present disclosure relates to the field of wireless communication, and in particular, to a user equipment (UE), a base station (gNB) and wireless communication methods related to resource determination for Uplink Control Information (UCI) in case of Bandwidth part (BWP) switching in NR (New Radio access technology).

2. Description of the Related Art

BWP is a new concept specified in NR and it consists of one or multiple continuous Physical Resource Blocks (PRBs) in frequency domain in a carrier. Thus, BWP may be considered as subdivision of a carrier. For certain User Equipment (UE), it can be configured with multiple BWPs within a carrier. In current NR specification, dynamic switching of BWP is supported.

SUMMARY

One non-limiting and exemplary embodiment facilitates determining the resource for UCI in case of BWP switching in NR to reduce the feedback latency and to improve the system performance.

In a first general aspect of the present disclosure, there is provided a user equipment, comprising: a receiver operative to receive, from a base station in a slot, a Downlink Control Information (DCI) for Bandwidth Part (BWP) switching from a first BWP to a second BWP; circuitry operative to drop a Uplink Control Information (UCI) to be transmitted in a BWP switching period of the first BWP, and to determine the earliest available slot of the second BWP or a third BWP, the BWP switching period being from the slot where the DCI for BWP switching is received until starting the second BWP to which the first BWP is switched according to the DCI; and a transmitter operative to transmit the dropped UCI in the determined earliest available slot of the second BWP or the third BWP to the base station.

In a second general aspect of the present disclosure, there is provided a base station, comprising: a transmitter operative to transmit to a user equipment in a slot a Downlink Control Information (DCI) for Bandwidth Part (BWP) switching from a first BWP to a second BWP; a receiver operative to receive a Uplink Control Information (UCI) in the earliest available slot of the second BWP or a third BWP from the user equipment; and circuitry operative to decode the UCI, wherein the UCI to be transmitted in a BWP switching period of the first BWP is dropped by the user equipment, and the earliest available slot of the second or the third BWP is determined by the user equipment, the BWP switching period being from the slot where the DCI for BWP switching is received by the user equipment until starting the second BWP to which the first BWP is switched according to the DCI.

In a third general aspect of the present disclosure, there is provided a wireless communication method for a user equipment, comprising: receiving, from a base station in a slot, a Downlink Control Information (DCI) for Bandwidth Part (BWP) switching from a first BWP to a second BWP; dropping a Uplink Control Information (UCI) to be transmitted in a BWP switching period of the first BWP, and determining the earliest available slot of the second BWP or a third BWP, the BWP switching period being from the slot where the DCI for BWP switching is received until starting the second BWP to which the first BWP is switched according to the DCI; and transmitting the dropped UCI in the determined earliest available slot of the second BWP or the third BWP to the base station.

In a fourth general aspect of the present disclosure, there is provided a wireless communication method for a base station, comprising: transmitting to a user equipment in a slot a Downlink Control Information (DCI) for Bandwidth Part (BWP) switching from a first BWP to a second BWP; receiving a Uplink Control Information (UCI) in the earliest available slot of the second BWP or a third BWP from the user equipment; and decoding the UCI, wherein the UCI to be transmitted in a BWP switching period of the first BWP is dropped by the user equipment, and the earliest available slot of the second or the third BWP is determined by the user equipment, the BWP switching period being from the slot where the DCI for BWP switching is received by the user equipment until starting the second BWP to which the first BWP is switched according to the DCI.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
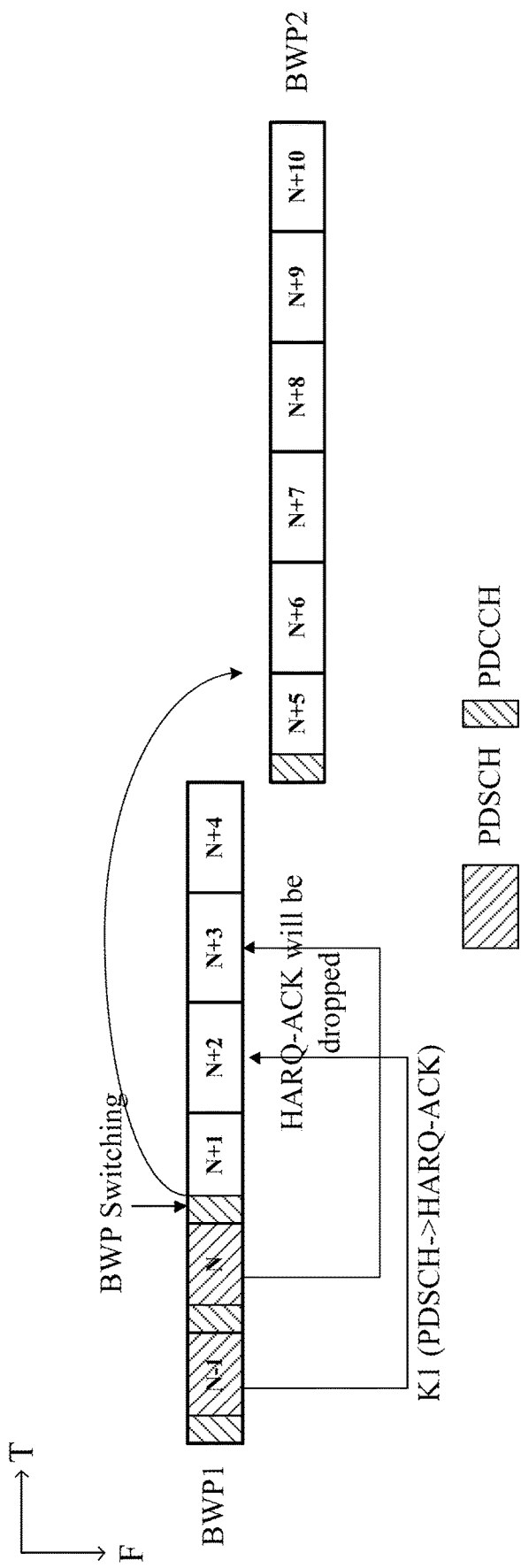
FIG. 1 schematically shows an exemplary scenario of HARQ-ACK dropping in case of BWP switching.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

It is specified in latest specification 38.213_v2.0.0 that "For paired spectrum operation, a UE is not expected to transmit HARQ-ACK if the UE changes its active UL BWP between a time of a detection of a DCI format 1_1 and a time of a corresponding HARQ-ACK transmission". This behavior will cause some performance loss due to Hybrid Automatic Repeat request-Acknowledgement (HARQ-ACK) dropping. Although the standard only describes paired spectrum case, above behavior would be applied to unpaired spectrum case as well due to same reasoning. FIG. 1 schematically shows an exemplary scenario of HARQ-ACK dropping in case of BWP switching taking unpaired spectrum as an example. In FIG. 1, the horizontal axis indicated by "T" represents the time axis and the vertical axis indicated by "F" represents the frequency axis. Along the time axis, bolded boxes indicated as N−1, N, N+1, . . . , N+10 represents slots. It is assumed that there are two BWPs in one carrier, as shown by "BWP1" and "BWP2" along the frequency axis. Furthermore, boxes filled with left slash represent Physical Downlink Shared Channels (PDSCHs) while boxes filled with right slash represent Physical Downlink Control Channels (PDCCHs).

As shown in FIG. 1, UE has received PDSCHs in slots N−1 and N. Based on the timing indicated in scheduled Downlink Control Information (DCI), the UE is supposed to feedback HARQ-ACK in terms of Physical Uplink Control Channel (PUCCH) in slots N+2 and N+3 respectively.

Here, the timing is indicated by K1 in FIG. 1, which means the timing from PDSCH to HARQ-ACK, as shown by two arrows pointing from slot N−1 to slot N+2 and from slot N to slot N+3 respectively. However, since UE has received BWP switching DCI in slot N+1, all of slots N+1 to N+4 in the BWP switching period should be used for preparing BWP switching according the current specification in NR. Thus, it has to drop HARQ-ACKs which are originally to be transmitted in slots N+2 and N+3 due to BWP switching preparation. In this case, due to not receiving these HARQ-ACKs, the Base Station (BS) is possible to retransmit PDSCH on BWP2, which will influence the total throughput and thus cause some performance loss.

To resolve the above problem, one prior art method is to transmit the dropped HARQ-ACKs in some slot, which is determined based on the timing indicated in BWP switching DCI (Downlink (DL) assignment or Uplink (UL) grant), on BWP2. However, with this prior art method, the latency of HARQ-ACKs may be large, and it is unclear how to handle it in paired spectrum case.

Figure 2:
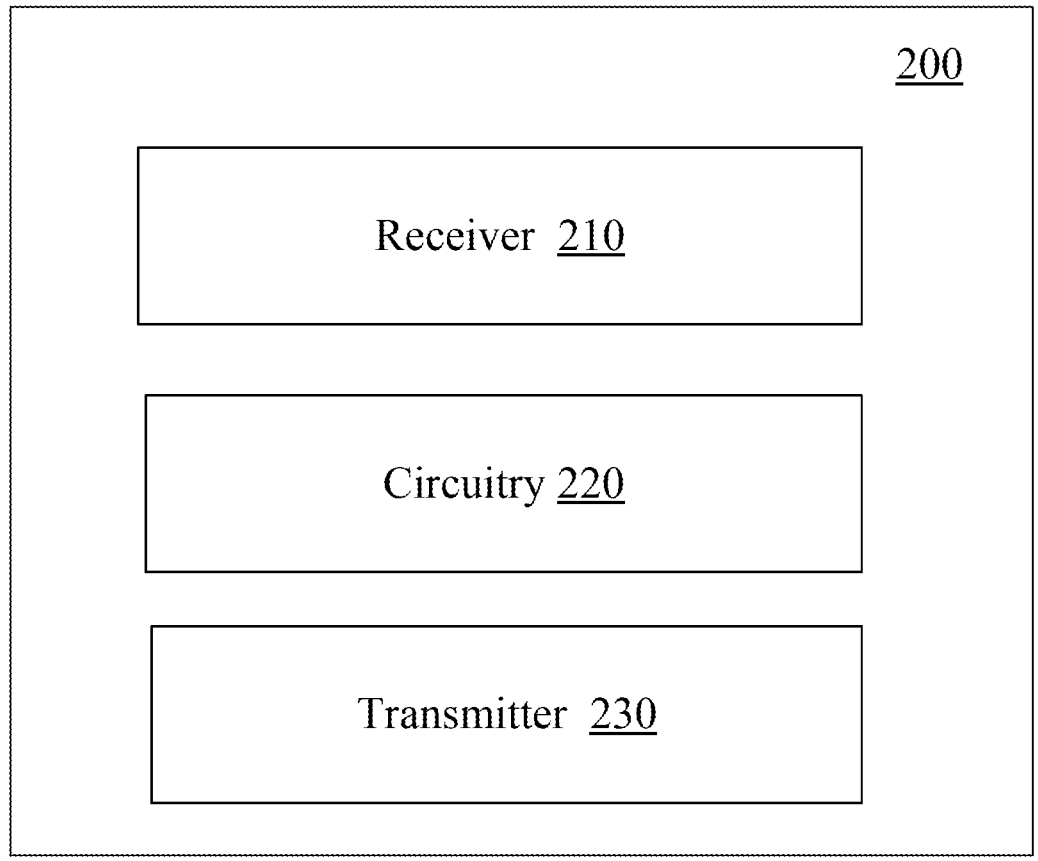
FIG. 2 illustrates a block diagram of a part of a user equipment according to an embodiment of the present disclosure.

In view of the above, in an embodiment of the present disclosure, there is provided a user equipment as shown in FIG. 2. FIG. 2 illustrates a block diagram of a part of a user equipment 200 according to an embodiment of the present disclosure. As shown in FIG. 2, the UE 200 may include a receiver 210, circuitry 220 and a transmitter 230. The receiver 210 is operative to receive, from a base station in a slot, a Downlink Control Information (DCI) for Bandwidth Part (BWP) switching from a first BWP to a second BWP. The circuitry 220 is operative to drop a Uplink Control Information (UCI) to be transmitted in a BWP switching period of the first BWP, and to determine the earliest available slot of the second BWP or a third BWP. The BWP switching period is from the slot where the DCI for BWP switching is received until starting the second BWP to which the first BWP is switched according to the DCI. The transmitter 230 is operative to transmit the dropped UCI in the determined earliest available slot of the second BWP or the third BWP to the base station.

Specifically, in order to facilitate understanding, refer to FIG. 1 again. In FIG. 1, the first BWP is BWP1. As described before, UE receives DCI for BWP switching from a BS in slot N+1 of BWP1. As shown in FIG. 1, the slot receiving the DCI for BWP switching is slot N+1, and BWP is switched from BWP1 to BWP2 at slot N+5. Thus, the second BWP is BWP2 and the BWP switching period is from slot N+1 to slot N+4 which is the slot immediately precious to slot N+5. Here, it is assumed that slots N+2 and N+3 in the BWP switching period (slot N+1 to slot N+4) should be used by UE for preparing BWP switching, thus HARQ-ACKs originally to be transmitted in slots N+2 and N+3 will be dropped. According to the present disclosure, the dropped HARQ-ACKs may be transmitted in the earliest available slot of BWP2, for example, slot N+5. Apparently, slot N+5 is later than slots N+2 and N+3.

In addition, although it is specified in the current specification in NR that all of slots in the BWP switching period are used for preparing BWP switching and should not transmit UCI, in fact, it may not need so much slots to prepare BWP switching. Thus, UCI originally to be transmitted in a slot not for preparing BWP switching in the BWP switching period does not need to be dropped, which will be described in details later.

Furthermore, the dropped UCI may not only be transmitted on the second BWP, but also be transmitted on the third BWP, which will be discussed in details later.

With the user equipment 200 as shown in FIG. 2, since the earliest available slot of a new BWP, which is different from the original BWP, is used to transmit the dropped UCI which is originally to be transmitted on the original BWP in case of BWP switching, the feedback latency may be reduced and the system performance may be improved.

According to an embodiment of the present disclosure, in the UE 200 as shown in FIG. 2, the earliest available slot of the second BWP or the third BWP is specified in standard, or indicated by slot format indicator (SFI) and/or configured by Radio Resource Control (RRC).

Specifically, the earliest available slot of the second BWP or the third BWP may be specified in standard, for example, may be specified as the first slot of the second BWP or the third BWP (e.g. slot N+5 of BWP2 in FIG. 1). Alternatively, the earliest available slot of the second BWP or the third BWP may be configured by RRC from the BS. Or, the earliest available slot of the second BWP or the third BWP may also depend on SFI. For example, if SFI in slot N+5 indicates current slot is all DL symbols and cannot transmit PUCCH, then next slot (slot N+6) which may have UL symbols for PUCCH can be used for transmit PUCCH, that is, functions as the earliest available slot of the second BWP. Apparently, the earliest available slot of the second BWP or the third BWP may be determined based on the combination of RRC and SFI.

For example, the range of slots which may functions as the earliest available slot of the second BWP or the third BWP may be configured by RRC, and one slot of the range may be indicated by SFI as the earliest available slot of the third BWP.

It is noted that the earliest available slot of the second BWP or the third BWP is not limited to the first slot of the second BWP or the third BWP, instead may be any other suitable slot according to the specific circumstances.

According to an embodiment of the present disclosure, in the UE 200 as shown in FIG. 2, all of slots in the BWP switching period are used for BWP switching.

Specifically, as described above, it is specified in the current specification in NR that all of slots in the BWP switching period are used for preparing BWP switching and should not transmit UCI. Thus, in view of the current specification in NR, the present disclosure is firstly described by way of some examples as follows.

Figure 3:
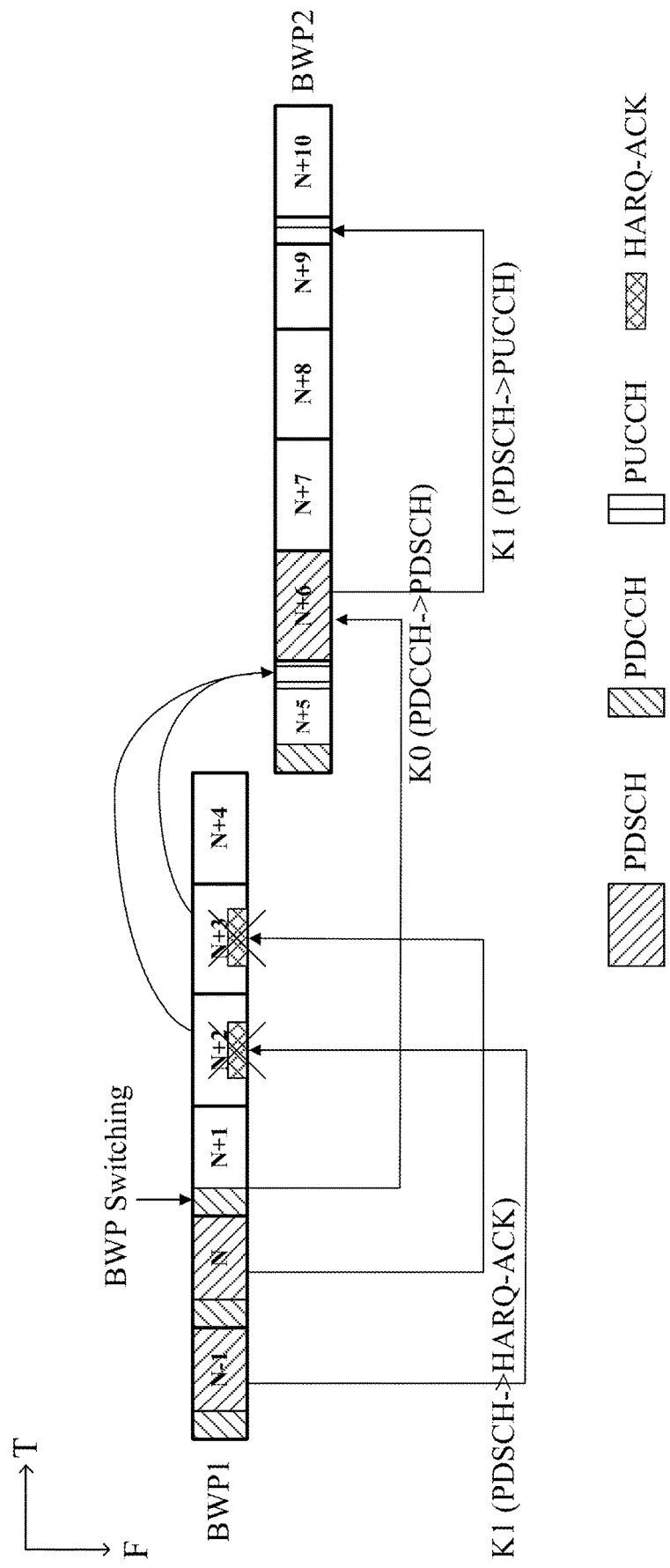
FIG. 3 schematically shows an exemplary scenario of HARQ-ACK dropping in case of BWP switching according to an embodiment of the present disclosure.

FIG. 3 schematically shows an exemplary scenario of HARQ-ACK dropping in case of BWP switching according to an embodiment of the present disclosure. In FIG. 3, the horizontal axis indicated by "T" represents the time axis and the vertical axis indicated by "F" represents the frequency axis. Along the time axis, bolded boxes indicated as N−1, N, N+1, . . . , N+10 represents slots. It is assumed that there are two BWPs in one carrier, as shown by "BWP1" and "BWP2" along the frequency axis. Furthermore, boxes filled with left slash represent PDSCHs, boxes filled with right slash represent PDCCHs, boxes filled with vertical lines represent PUCCHs, and boxes filled with cross lines represent HARQ-ACK.

As shown in FIG. 3, UE has received PDSCHs in slots N−1 and N. Based on the timing indicated in scheduled DCI, the UE is supposed to feedback HARQ-ACK in terms of PUCCH in slots N+2 and N+3 respectively. Here, the timing is indicated by K1 in FIG. 3, which means the timing from PDSCH to HARQ-ACK, as shown by two arrows pointing from slot N−1 to slot N+2 and from slot N to slot N+3 respectively. However, since UE has received DCI for BWP switching in slot N+1, all of slots N+1 to N+4 in the BWP switching period should be used for preparing BWP switching for Radio Frequency (RF) or baseband according to the current specification in NR. Thus, it has to drop HARQ-ACKs which are originally to be transmitted in slots N+2 and N+3, as shown by two crosses on HARQ-ACKs in slots N+2 and N+3.

It is also assumed that the DCI for BWP switching in slot N+1 will schedule PDSCH in slot N+6, as shown by arrows pointing from slot N+1 to slot N+6. Such timing is called K0 which means the timing from PDCCH to PDSCH. This also means that the DCI for BWP switching in slot N+1 is used for DL assignment. Further, based on the timing K1(PD-SCH→PUCCH) as shown by arrows pointing from slot N+6 to slot N+9, UE needs to feedback HARQ-ACK in terms of PUCCH in slot N+9 for PDSCH in slot N+6.

According to the present disclosure, the earliest available slot of BWP2 is slot N+5 and thus, the dropped HARQ-ACKs from slots N+2 and N+3 will be transmitted in slot N+5 in terms of PUCCH, as shown by the arc arrows. However, according to the prior art method, based on the timing scheduled in the DCI for BWP switching in slot N+1 (i.e. K0(PDCCH→PDSCH)), the dropped HARQ-ACKs from slots N+2 and N+3 will be transmitted in slot N+9 in terms of PUCCH. Thus, according to the present disclosure, the feedback latency can be reduced without influencing the timing scheduled in the DCI for BWP switching.

Figure 4:
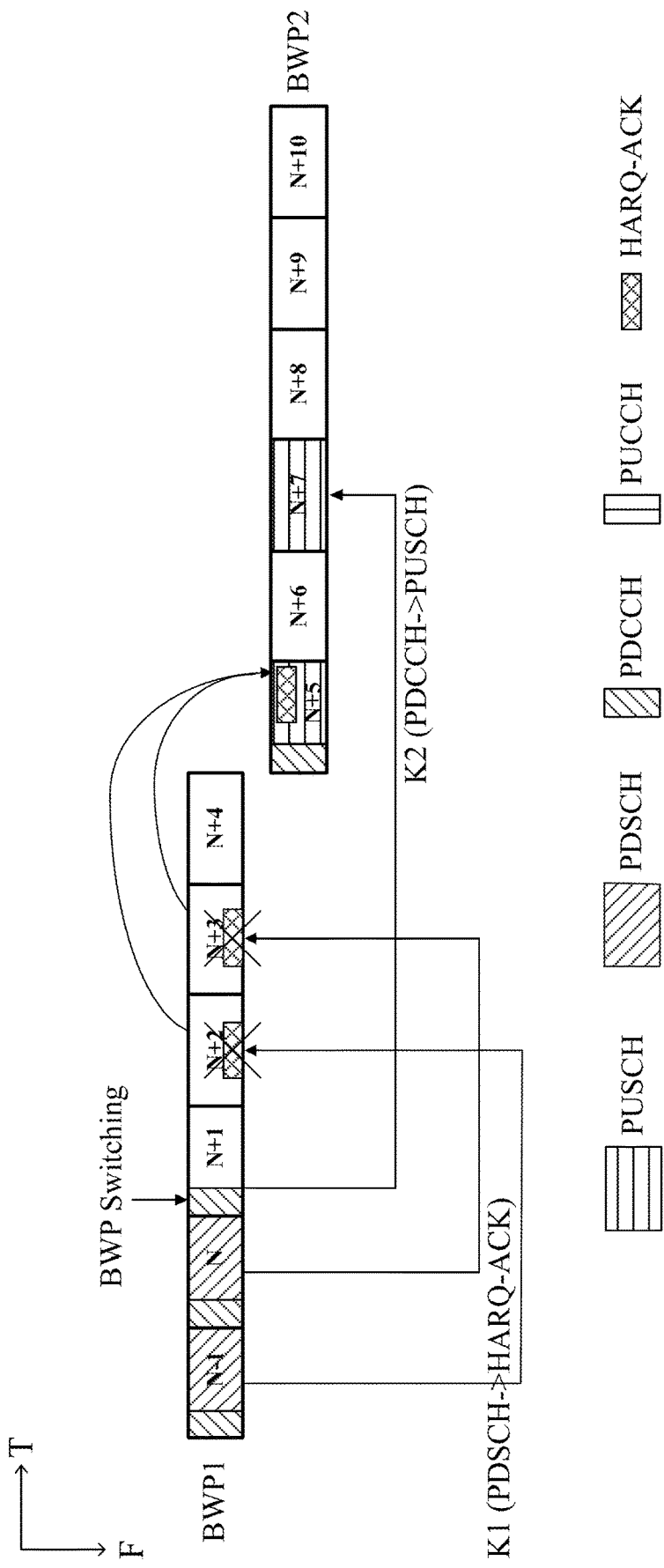
FIG. 4 schematically shows another exemplary scenario of HARQ-ACK dropping in case of BWP switching according to an embodiment of the present disclosure.

FIG. 4 schematically shows another exemplary scenario of HARQ-ACK dropping in case of BWP switching according to an embodiment of the present disclosure. In FIG. 4, the horizontal axis indicated by "T" represents the time axis and the vertical axis indicated by "F" represents the frequency axis. Along the time axis, bolded boxes indicated as N−1, N, N+1, . . . , N+10 represents slots. It is assumed that there are two BWPs in one carrier, as shown by "BWP1" and "BWP2" along the frequency axis. Furthermore, boxes filled with left slash represent PDSCHs, boxes filled with right slash represent PDCCHs, boxes filled with vertical lines represent PUCCHs, boxes filled with cross lines represent HARQ-ACK, and boxes filled with horizontal lines represent PUSCHs.

Similarly as in FIG. 3, in FIG. 4, UE has received PDSCHs in slots N−1 and N. Based on the timing (K1 (PDSCH→HARQ-ACK)) indicated in scheduled DCI, the UE is supposed to feedback HARQ-ACK in terms of PUCCH in slots N+2 and N+3 respectively. However, since UE has received DCI for BWP switching in slot N+1, all of slots N+1 to N+4 in the BWP switching period should be used for preparing BWP switching for Radio Frequency (RF) or baseband according to the current specification in NR. Thus, it has to drop HARQ-ACKs which are originally to be transmitted in slots N+2 and N+3, as shown by two crosses on HARQ-ACKs in slots N+2 and N+3.

It is also assumed that the DCI for BWP switching in slot N+1 will schedule PUSCH in slot N+7, as shown by arrows pointing from slot N+1 to slot N+7. Such timing is called K2 which means the timing from PDCCH to PUSCH. This also means that the DCI for BWP switching in slot N+1 is used for UL grant.

According to the present disclosure, the earliest available slot of BWP2 is slot N+5 and thus, the dropped HARQ-ACKs from slots N+2 and N+3 will be transmitted in slot N+5, as shown by the arc arrows. Since there is PUSCH transmitted in the same slot N+5, HARQ-ACK will be multiplexed in such PUSCH. However, according to the prior art method, based on the timing scheduled in the DCI for BWP switching in slot N+1 (i.e. K2(PDCCH-→PUSCH)), the dropped HARQ-ACKs from slots N+2 and N+3 will be transmitted in slot N+7 by multiplexing in PUSCH. Thus, according to the present disclosure, the feedback latency can be reduced without influencing the timing scheduled in the DCI for BWP switching.

It is noted that if there is no PUSCH scheduled in slot N+5 for UL, the dropped HARQ-ACKs from slots N+2 and N+3 may also be transmitted in PUCCH in slot N+5.

According to an embodiment of the present disclosure, in the UE 200 as shown in FIG. 2, the dropped UCI is transmitted in Physical Uplink Control Channel (PUCCH)

in the earliest available slot of the second BWP or the third BWP, or transmitted by multiplexing in Physical Uplink Shared Channel (PUSCH) in the earliest available slot of the second BWP or the third BWP.

Specifically, as shown in slot N+5 in FIG. 3 or FIG. 4, the dropped HARQ-ACKs from slots N+2 and N+3 may be transmitted in PUCCH in slot N+5 or transmitted by multiplexing in PUSCH in slot N+5.

According to an embodiment of the present disclosure, in the UE 200 as shown in FIG. 2, the DCI is for DL assignment or for UL grant.

Specifically, FIG. 3 shows a case that DCI for BWP switching received in slot N+1 is for DL assignment while FIG. 4 shows a case that DCI for BWP switching received in slot N+1 is for UL grant. In addition, the dropped HARQ-ACKs may be differently handled between the case of UL grant for BWP switching and the case of DL assignment for BWP switching, for example as described above by reference to FIG. 3 and FIG. 4.

According to an embodiment of the present disclosure, in the UE 200 as shown in FIG. 2, the DCI for BWP switching is received on the first BWP.

Specifically, in both FIG. 3 and FIG. 4, the first BWP is BWP1, which corresponds to a Time Division Duplexing (TDD) case (unpaired spectrum case) where UL and DL share a same BWP.

According to an embodiment of the present disclosure, in the UE 200 as shown in FIG. 2, the PUCCH resource position for transmitting the dropped UCI in the earliest available slot of the second BWP or the third BWP is determined according to one or more of RRC configuration, specification in the standard, implicit indication by Control Chanel Element (CCE) index of Physical Downlink Control Channel (PDCCH), explicit indication by Hybrid Automatic Repeat request-Acknowledgement (HARQ-ACK) resource indicator (ARI) in DCI, and UE ID.

Figure 5:
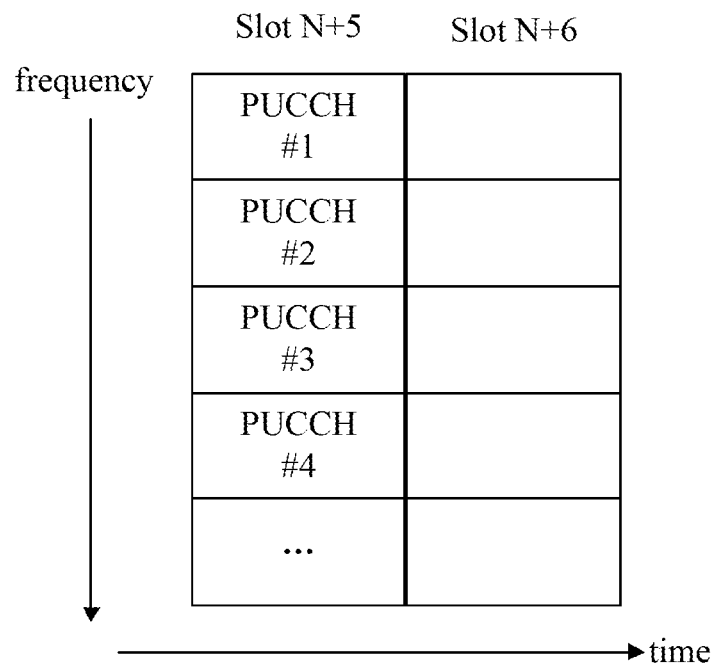
FIG. 5 schematically shows the arrangement of PUCCHs in slot N+5 in FIG. 4.

Specifically, as shown in FIG. 3, the dropped HARQ-ACKs from slots N+2 and N+3 will be transmitted in slot N+5 in terms of PUCCH. FIG. 5 schematically shows the arrangement of PUCCHs in slot N+5 in FIG. 4. In FIG. 5, along the time axis, two slots N+5 and N+6 are showed for example, while along the frequency axis, PUCCH #1, PUCCH #2, PUCCH #3, PUCCH #4 are shown in sequence in slot N+5.

Regarding determination of the exact PUCCH resource position (i.e. PUCCH resource index) in slot N+5 (for example, PUCCH #1 in slot N+5) used for transmitting HARQ-ACK dropped from slots N+2 and N+3, there could be multiple methods as follows.
1) The PUCCH resource index is purely based on RRC configuration. PUCCH #1 is configured as the resource to transmit HARQ-ACKs dropped in the last BWP (for example BWP1). To transmit HARQ-ACKs for multiple slots, bundling or multiplexing are either possible and could be configured.
2) The PUCCH resource index is specified in the standard. For example, PUCCH #1 is specified in the standard for transmitting HARQ-ACKs dropped in the last BWP.
3) The PUCCH resource index is implicitly indicated by CCE index of PDCCH. Such PDCCH can be the one to transmit BWP switching DCI (for example in slot N+1 in FIG. 3) or the one to schedule PDSCH (for example in slot N−1 in FIG. 3). Assuming CCE index of PDCCH is #2, PUCCH #2 in slot N+5 is used for transmitting dropped HARQ-ACKs from slots N+2 and N+3 in FIG. 3.
4) The PUCCH resource index is explicitly indicated by ARI in DCI. Such DCI can be the BWP switching DCI (for example in slot N+1 in FIG. 3) or the DCI scheduling PDSCH (for example in slot N−1 or in slot N in FIG. 3). For example, ARI of DCI indicates PUCCH #2, PUCCH #2 is used for transmitting dropped HARQ-ACKs from slots N+2 and N+3 in FIG. 3.
5) The PUCCH resource index is based on UE ID. For example, UE ID is 1000 and mod (UE ID, 4)+1 is used for determining the PUCCH resource index. Then, PUCCH #1 is used for transmitting dropped HARQ-ACKs from slots N+2 and N+3 in FIG. 3 for example.
6) Any combination of 1) to 5). For example, four PUCCH resources totally (PUCCH #1 to PUCCH #4) are configured by RRC and ARI is used to indicate one of them (PUCCH #1) to be used for transmitting HARQ-ACKs dropped in the last BWP (for example BWP1).

According to an embodiment of the present disclosure, in the UE 200 as shown in FIG. 2, resource position for UCI multiplexed in PUSCH is specified in the standard.

Specifically, as shown in FIG. 4, the dropped HARQ-ACKs from slots N+2 and N+3 will be transmitted in slot N+5 by multiplexing in PUSCH. The determination of HARQ-ACK position in PUSCH in slot N+5 may be specified in current specification and same as current NR standard 3GPP 38.213.

According to an embodiment of the present disclosure, in the UE 200 as shown in FIG. 2, the DCI for BWP switching is received on a fourth BWP, and the first BWP and the fourth BWP correspond to same slots.

FIG. 3 and FIG. 4 are both TDD case (i.e. unpaired spectrum case). However, the present disclosure is not only applied to TDD case, but also may be applicable to Frequency Division Duplexing (FDD) case (i.e. paired spectrum case).

Figure 6:
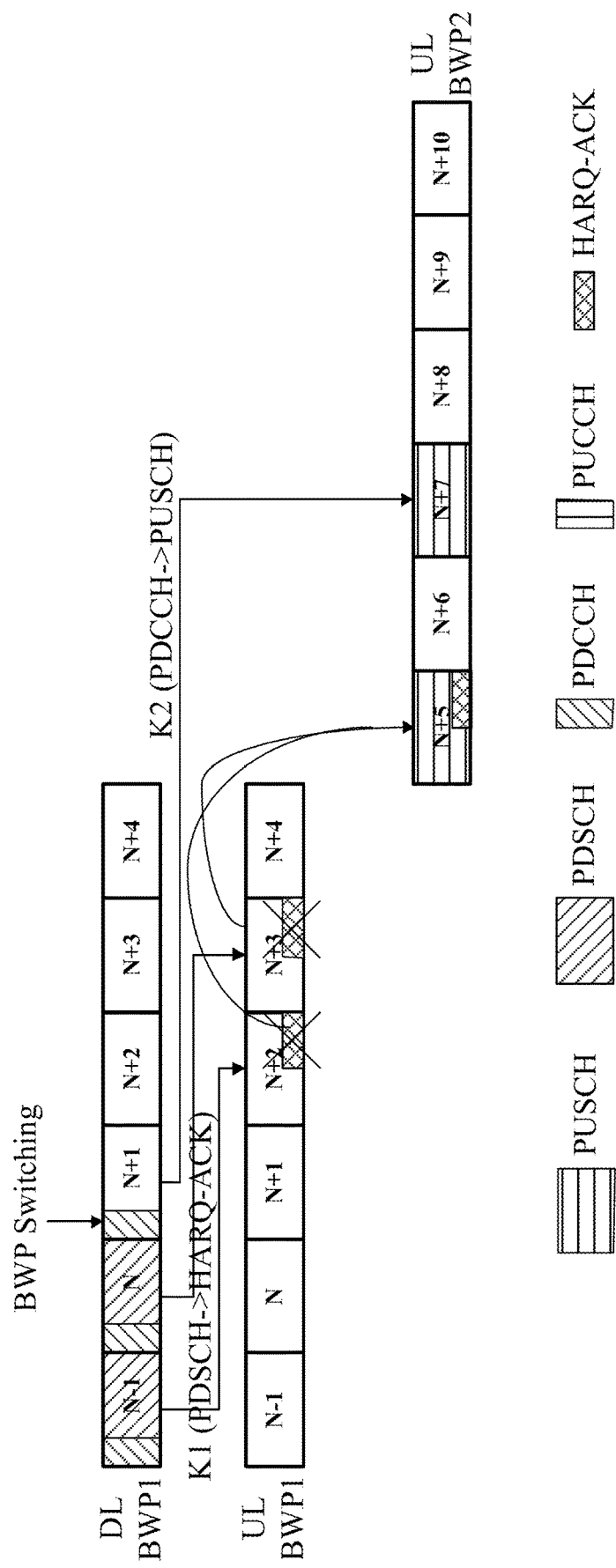
FIG. 6 schematically shows another exemplary scenario of HARQ-ACK dropping in case of BWP switching according to an embodiment of the present disclosure.

FIG. 6 schematically shows another exemplary scenario of HARQ-ACK dropping in case of BWP switching according to an embodiment of the present disclosure. FIG. 6 is FDD case in which UL and DL have respective BWPs separate from each other, while in TDD case (e.g. FIG. 3 and FIG. 4) UL and DL share a same BWP. The same portions in FIG. 6 as those in FIG. 4 will not be described here for avoid redundancy. The only difference between them is that there is paired BWP (DL BWP1 and UL BWP1) before BWP switching. Thus, in this case, the first BWP is UL BWP 1 and the fourth BWP is DL BWP 1, but UL BWP 1 and DL BWP 1 are paired and thus correspond to same slots (slot N−1 to slot N+4).

Similarly as in FIG. 4, in FIG. 6, UE has received DCI for BWP switching, which is used for UL grant, in slot N+1. That is to say, the DCI received in slot N+1 by UE indicates UL BWP switching from UL BWP1 to UL BWP2, which is the second BWP, in slot N+5. In FIG. 6, basic handling of HARQ-ACK transmission is same as that in FIG. 4. That is, the earliest available slot of UL BWP2 is slot N+5 and thus, the dropped HARQ-ACKs from slots N+2 and N+3 will be transmitted in slot N+5 by for example multiplexing in PUSCH, as shown by the arc arrows.

Thereby, the feedback latency can be reduced without influencing the timing scheduled in the DCI for BWP switching.

According to an embodiment of the present disclosure, in the UE 200 as shown in FIG. 2, the first BWP is in a first carrier and the third BWP is in a second carrier, and the first BWP and the third BWP correspond to same slots.

FIG. 3, FIG. 4 and FIG. 6 all correspond to single-carrier case. However, the present disclosure is not only applied to single-carrier case, but also may be applicable to multiple-carrier case.

Figure 7:
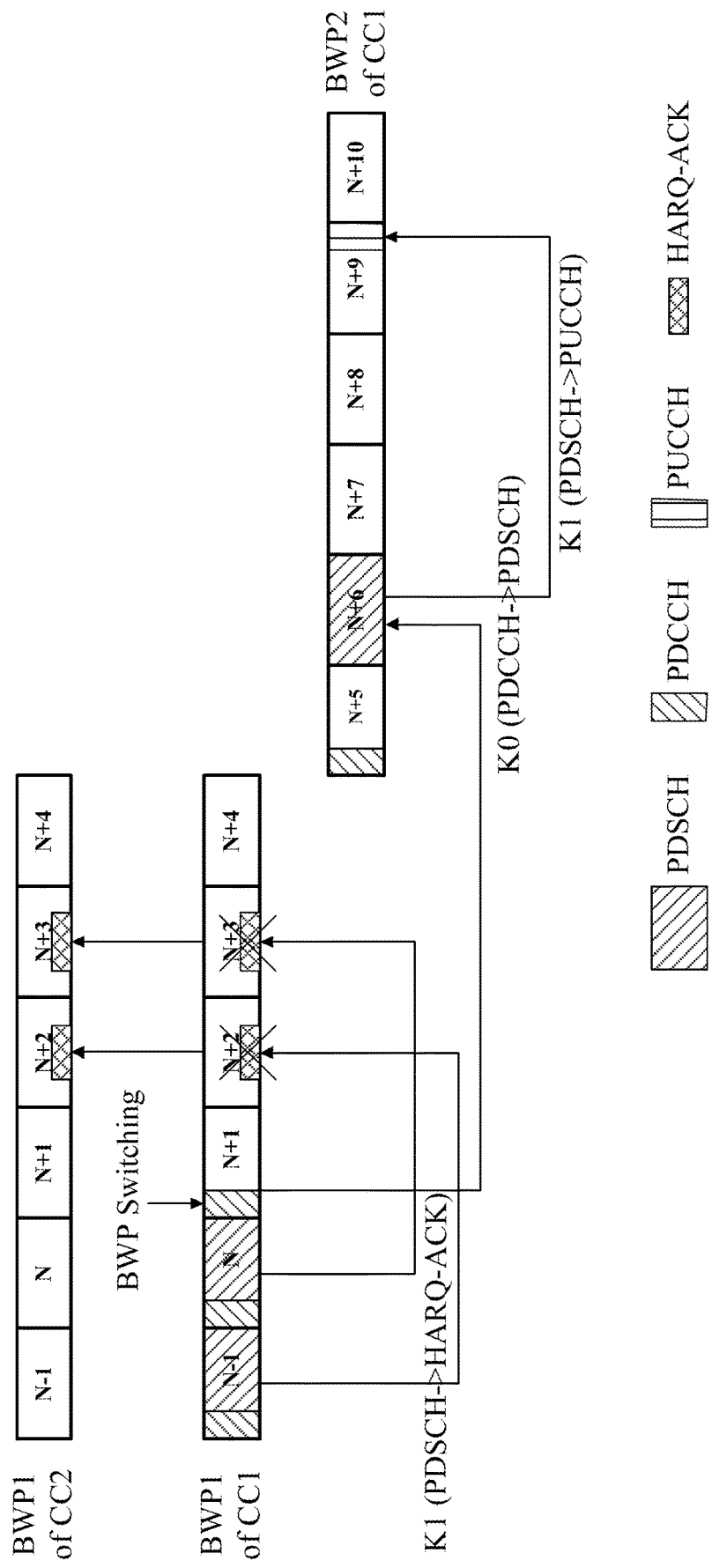
FIG. 7 schematically shows another exemplary scenario of HARQ-ACK dropping in case of BWP switching according to an embodiment of the present disclosure.

FIG. 7 schematically shows another exemplary scenario of HARQ-ACK dropping in case of BWP switching according to an embodiment of the present disclosure. FIG. 7 is Carrier Aggregation (CA) case in which it is assumed that UE is capable of two carries (CC1 and CC2). In FIG. 7, BWP1 of CC1 and BWP2 of CC1 may be considered as being the same as BWP1 and BWP2 in FIG. 3. The same portions in FIG. 7 as those in FIG. 3 will not be described here for avoid redundancy. The difference between them is that in FIG. 7, instead of transmitting the HARQ-ACKs dropped from slots N+2 and N+3 of BWP1 of CC1 in slot N+5 of BWP2 within the same carrier CC1, UE will transmit such HARQ-ACKs in another carrier CC2 but within the same slot. As shown in FIG. 7, HARQ-ACK dropped from slot N+2 on BWP1 of CC1 will be transmitted in slot N+2 on BWP1 of CC2, while HARQ-ACK dropped from slot N+3 on BWP1 of CC1 will be transmitted in slot N+3 on BWP1 of CC2. That is to say, HARQ-ACKs originally to be transmitted in slots N+2 and N+3 on BWP1 of CC1 are shifted to slots N+2 and N+3 on BWP1 of CC2 respectively. In this case, both the first BWP is BWP1 of CC1, the third BWP corresponds to BWP1 of CC2 and the second BWP is BWP2 of CC1, and the earliest available slot of the third BWP corresponds to slots N+2 and N+3 of BWP1 of CC2. That is to say, the dropped UCI is transmitted in the earliest available slot of the third BWP in this case, which is different from the above cases where the dropped UCI is transmitted in the earliest available slot of the second BWP.

Thereby, compared with the above described cases of transmitting the dropped HARQ-ACK in slot N+5 (FIG. 3, FIG. 4 and FIG. 6), there is no impact on HARQ-ACK timing in FIG. 7.

It is noted that although FIG. 7 shows TDD case (i.e. unpaired spectrum case), the present disclosure is not limited thereto, and the present disclosure may also be applicable to FFD & CA case. It is also noted that the shifting of such HARQ-ACKs is not limited to the same slot.

The earliest available slot on BWP1 of CC2 may also depend on RRC configuration and/or SFI indication for CC2. For example, if it is configured by RRC that certain PUCCH in slot N+4 on BWP1 of CC2 can be used for such HARQ-ACK shifting, HARQ-ACK dropped from slots N+2 and N+3 on BWP1 of CC1 will be transmitted in slot N+4 on BWP1 of CC2. Apparently, the earliest available slot of BWP1 of CC2 may also be specified in the standard. Apparently, in this case the earliest available slot of BWP1 of CC2 should be no earlier than slots N+2 and N+3 respectively.

It is noted that FIG. 7 is only for illustrative purpose and the present disclosure is not limited thereto. Since component carrier (CC) may be different, BWP1 of CC1 and BWP1 of CC2 is not necessarily corresponds same slots. For example, the length of each slot of BWP1 of CC1 may be different from that of BWP1 of CC2. In this case, determining which slot on BWP1 of CC2 the dropped UCI from BWP1 of CC1 is shifted to is equivalent to determining the earliest available slot of BWP1 of CC2. And as described above, the earliest available slot on BWP1 of CC2 may depend on RRC configuration and/or SFI indication for CC2.

According to an embodiment of the present disclosure, in the UE 200 as shown in FIG. 2, there is no DCI for BWP switching received on the third BWP, and/or one of the first BWP and the third BWP is used for Scell and the other thereof is used for Pcell or a configured cell, and/or the cell for which one of the first BWP and the third BWP is used is Supplementary UL (SUL).

Specifically, in FIG. 7, the BWP1 of CC2 is determined as the BWP for transmitting the dropped HARQ-ACKs from BWP1 of CC1. The determination of CC/BWP index (e.g. CC2/BWP1 in FIG. 7) to shift the dropped HARQ-ACK is based on at least one of following factors:
1) Whether the cell is Pcell;
2) Whether the cell is configured cell;
3) Whether the cell has BWP switching; and
4) Whether the cell is SUL or non-SUL.

More specifically, in FIG. 7, if one of BWP1 of CC1 and BWP1 of CC2 is for Pcell and the other is for Scell, BWP1 of CC2 may be determined to transmit the dropped HARQ-ACK from BWP1 of CCL. If one of BWP1 of CC1 and BWP1 of CC2 is for a cell which is specially configured as backup for the cell of the other, BWP1 of CC2 may be determined to transmit the dropped HARQ-ACK from BWP1 of CC1. If there is no BWP switching in the cell of BWP1 of CC2, BWP1 of CC2 may be determined to transmit the dropped HARQ-ACK from BWP1 of CC1. If one of BWP1 of CC1 and BWP1 of CC2 is for a cell which is SUL meaning that there is only UL without DL, BWP1 of CC2 may be determined to transmit the dropped HARQ-ACK from BWP1 of CC1.

It is noted that FIG. 7 is only for illustrative purpose and the present disclosure is not limited thereto. Even in a CA case, the dropped UCI from a CC is not necessarily shifted to another CC. Instead, the dropped UCI from BWP1 of CC1 may also be shifted to the earliest available slot (e.g. slot N+5) of BWP2 of CC1. For example, when the above conditions are not satisfied, the dropped UCI from BWP1 of CC1 cannot be shifted to BWP1 of CC2. Or, maybe the BS or UE just prefer transmitting the dropped UCI on CC1. Thus, even in a CA case, the dropped UCI may be transmitted in the earliest available slot of the second BWP or the third BWP. Which rule is used can also be configured by RRC or indicated by DCI.

According to an embodiment of the present disclosure, in the UE 200 as shown in FIG. 2, UCI to be transmitted in a slot not used for BWP switching in the BWP switching period is not dropped by the user equipment, and the number of slots used for BWP switching in the BWP switching period is specified in the standard or configured based on the user equipment's capability of BWP switching.

Specifically, FIG. 3, FIG. 4, FIG. 6 and FIG. 7 all correspond to a case that all of slots (slot N+1 to slot N+4) are needed for preparing BWP switching according to the current specification in NR. However, it is possible that only some of these slots are sufficient for preparing BWP switching in the future. The present disclosure is also applied to the latter case.

Figure 8:
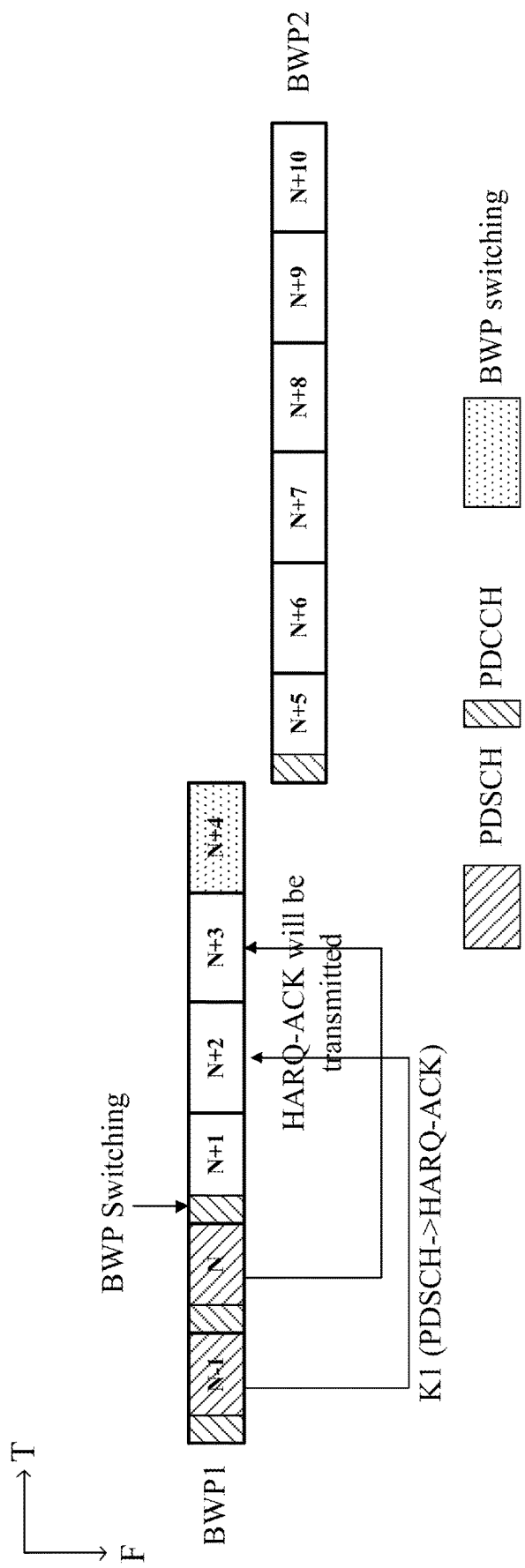
FIG. 8 schematically shows another exemplary scenario of HARQ-ACK dropping in case of BWP switching according to an embodiment of the present disclosure.

FIG. 8 schematically shows another exemplary scenario of HARQ-ACK dropping in case of BWP switching according to an embodiment of the present disclosure. The same portions in FIG. 8 as those in FIG. 3 or FIG. 4 will not be described here for avoid redundancy. The difference of FIG. 8 from FIG. 3 or FIG. 4 is that only slot 4 in the BWP switching period needs to be used for preparing BWP switching, as shown by the bolded box filled with points and indicated as "N+4". Thus, there is no need to drop, delay or shift the HARQ-ACKs originally to be transmitted in slot N+2 and slot N+3 on BWP1. The HARQ-ACKs can be transmitted in slots N+2 and N+3 respectively based on the indicated timing. Similarly, although not shown in FIG. 7, if there is HARQ-ACK originally to be transmitted in slot N+1 on BWP1, such HARQ-ACK does not need to be dropped, delayed or shifted.

Although not shown in FIG. 7, if there is HARQ-ACK originally to be transmitted in slot N+4 on BWP1, such HARQ-ACK needs to be dropped and will be transmitted in the earliest available slot of another BWP (for example, slot N+5 of BWP2). The principle of handling such HARQ-ACK is basically the same as those in FIG. 3, FIG. 4, FIG. 6 and FIG. 7, and will not be described here for avoid redundancy.

To summary, whether HARQ-ACK needs to be shifted depends on UE capability of BWP switching time and/or slot duration. UE can report its capability of BWP switching time and base station implicitly or explicitly indicates how many symbols/slots are needed for BWP switching. By so, there is no ambiguity between UE and base station.

According to an embodiment of the present disclosure, in the UE 200 as shown in FIG. 2, the semi-static codebook size is determined for the earliest available slot of the second BWP or the third BWP by taking into consideration of the dropped UCI.

Specifically, for semi-static codebook size determination, HARQ-ACKs originally to be transmitted in BWP switching period are also considered for slot for real HARQ-ACK transmission, that is, the earliest available slot of the second BWP or the third BWP. For example, before considering such proposal disclosed in the present disclosure, 4 bits are determined as codebook size. After considering such proposal disclosed in the present disclosure, 6 bits are needed for codebook size. Additional 2 bits are used for feedback of HARQ-ACKs to be dropped during BWP switching time.

According to an embodiment of the present disclosure, in the UE 200 as shown in FIG. 2, UCI comprises HARQ-ACK and/or Channel State Information (CSI).

Specifically, although the above examples assume HARQ-ACK as UCI, the present disclosure is not limited thereto. The present disclosure is also applicable to CSI or the other kinds of UCI.

Figure 9:
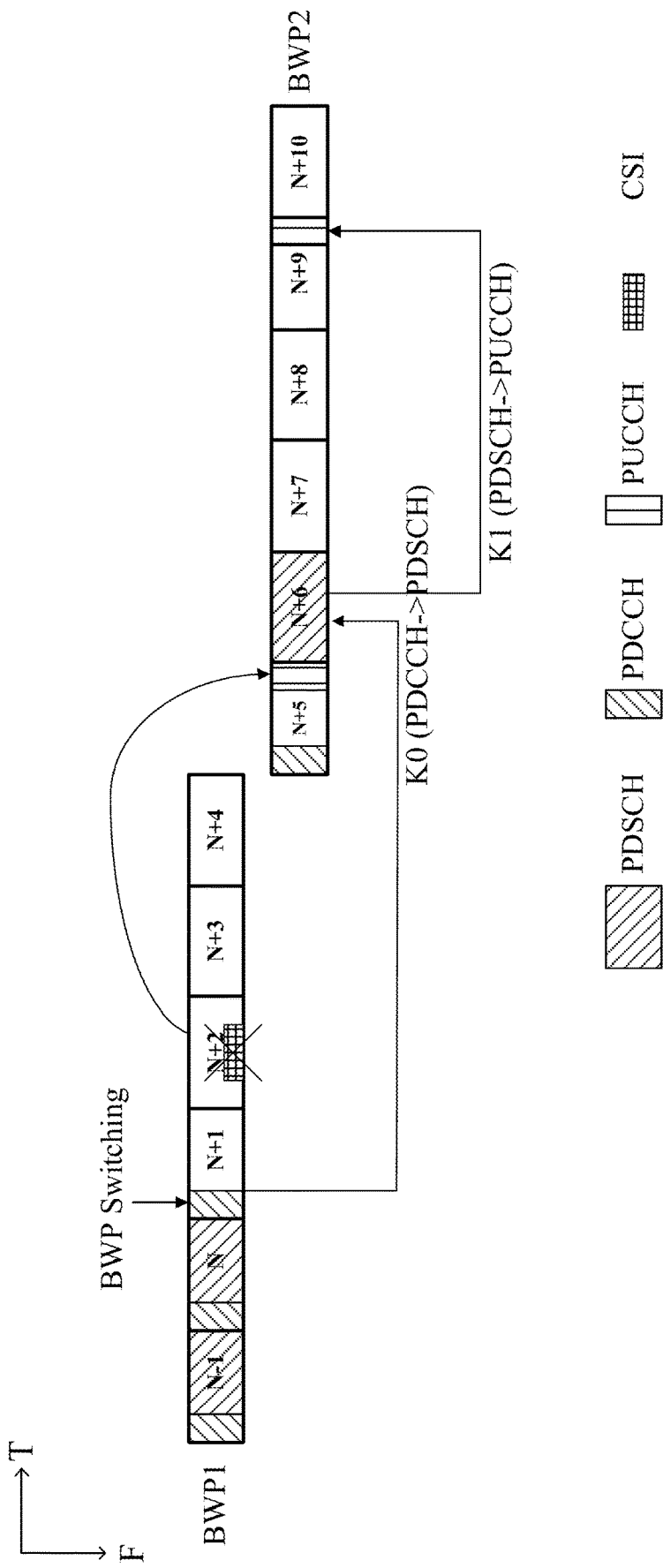
FIG. 9 schematically shows an exemplary scenario of CSI dropping in case of BWP switching according to an embodiment of the present disclosure.

FIG. 9 schematically shows an exemplary scenario of CSI dropping in case of BWP switching according to an embodiment of the present disclosure. The same portions in FIG. 9 as those in FIG. 3 will not be described here for avoid redundancy. The difference of FIG. 9 from FIG. 3 is that CSI is originally to be transmitted in slot N+2 on BWP1 based on RRC configuration or indication by previous DCI, as shown by the box filled with grid lines. Similarly with cases of HARQ-ACK, the CSI to be transmitted in slot N+2 on BWP1 will be dropped and transmitted in slot N+5 on BWP2.

In the above, the UE 200 is described in detail with reference to FIGS. 1-9. With the UE 200, by using the earliest available slot of a new BWP, which is different from the original BWP, to transmit the dropped UCI which is originally to be transmitted on the original BWP in case of BWP switching, the feedback latency may be reduced and the system performance may be improved.

Figure 10:
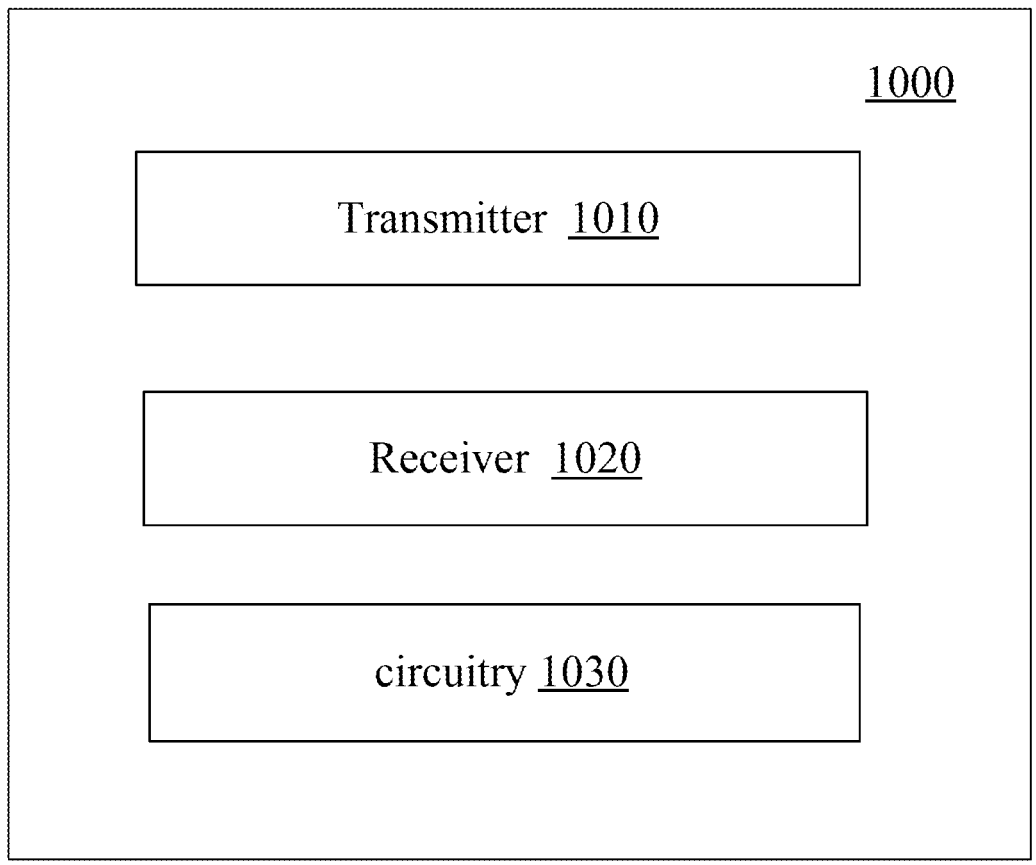
FIG. 10 illustrates a block diagram of a part of a base station according to an embodiment of the present disclosure.

In another embodiment of the present disclosure, there is provided a base station as shown in FIG. 10. FIG. 10 illustrates a block diagram of a part of a base station 1000 according to an embodiment of the present disclosure. As shown in FIG. 10, BS 1000 may comprise a transmitter 1010, a receiver 1020 and circuitry 1030. The transmitter 1010 is operative to transmit to a user equipment in a slot a Downlink Control Information (DCI) for Bandwidth Part (BWP) switching from a first BWP to a second BWP. The receiver 1020 is operative to receive a Uplink Control Information (UCI) in the earliest available slot of the second BWP or a third BWP from the user equipment. The circuitry 1030 is operative to decode the UCI. The UCI to be transmitted in a BWP switching period of the first BWP is dropped by the user equipment, and the earliest available slot of the second or the third BWP is determined by the user equipment, the BWP switching period being from the slot where the DCI for BWP switching is received by the user equipment until starting the second BWP to which the first BWP is switched according to the DCI. For example, the user equipment may be the UE 200 as shown in FIG. 2.

According to an embodiment of the present disclosure, the earliest available slot of the second BWP or the third BWP is specified in standard, or indicated by slot format indicator (SFI) and/or configured by Radio Resource Control (RRC).

According to an embodiment of the present disclosure, the dropped UCI is transmitted in Physical Uplink Control Channel (PUCCH) in the earliest available slot of the second BWP or the third BWP, or transmitted by multiplexing in Physical Uplink Shared Channel (PUSCH) in the earliest available slot of the second BWP or third BWP.

According to an embodiment of the present disclosure, the PUCCH resource position for transmitting the dropped UCI in the earliest available slot of the second BWP or the third BWP is determined according to one or more of RRC configuration, specification in the standard, implicit indication by Control Chanel Element (CCE) index of Physical Downlink Control Channel (PDCCH), explicit indication by Hybrid Automatic Repeat request-Acknowledgement (HARQ-ACK) resource indicator (ARI) in DCI, and UE ID.

According to an embodiment of the present disclosure, resource position for UCI multiplexed in PUSCH is specified in the standard.

According to an embodiment of the present disclosure, the DCI is for Downlink (DL) assignment or for Uplink (UL) grant.

According to an embodiment of the present disclosure, the DCI for BWP switching is received on the first BWP.

According to an embodiment of the present disclosure, the DCI for BWP switching is transmitted on a fourth BWP, and the first BWP and the fourth BWP correspond to same slots.

According to an embodiment of the present disclosure, the first BWP is in a first carrier and the third BWP is in a second carrier, and the first BWP and the third BWP correspond to same slots.

According to an embodiment of the present disclosure, there is no DCI for BWP switching received on the third BWP, and/or one of the first BWP and the third BWP is used for Scell and the other thereof is used for Pcell or a configured cell, and/or the cell for which one of the first BWP and the third BWP is used is Supplementary UL (SUL).

According to an embodiment of the present disclosure, all of slots in the BWP switching period are used for BWP switching.

According to an embodiment of the present disclosure, UCI to be transmitted in a slot not used for BWP switching in the BWP switching period is not dropped by the user equipment, and the number of slots use for BWP switching in the BWP switching period is specified in the standard or configured based on the user equipment's capability of BWP switching.

According to an embodiment of the present disclosure, the semi-static codebook size is determined for the earliest available slot of the second BWP or the third BWP by taking into consideration of the dropped UCI.

According to an embodiment of the present disclosure, UCI comprises HARQ-ACK and/or Channel State Information (CSI).

With the BS 1000, by using the earliest available slot of a new BWP, which is different from the original BWP, to transmit the dropped UCI which is originally to be transmitted on the original BWP in case of BWP switching, the feedback latency may be reduced and the system performance may be improved.

Figure 11:
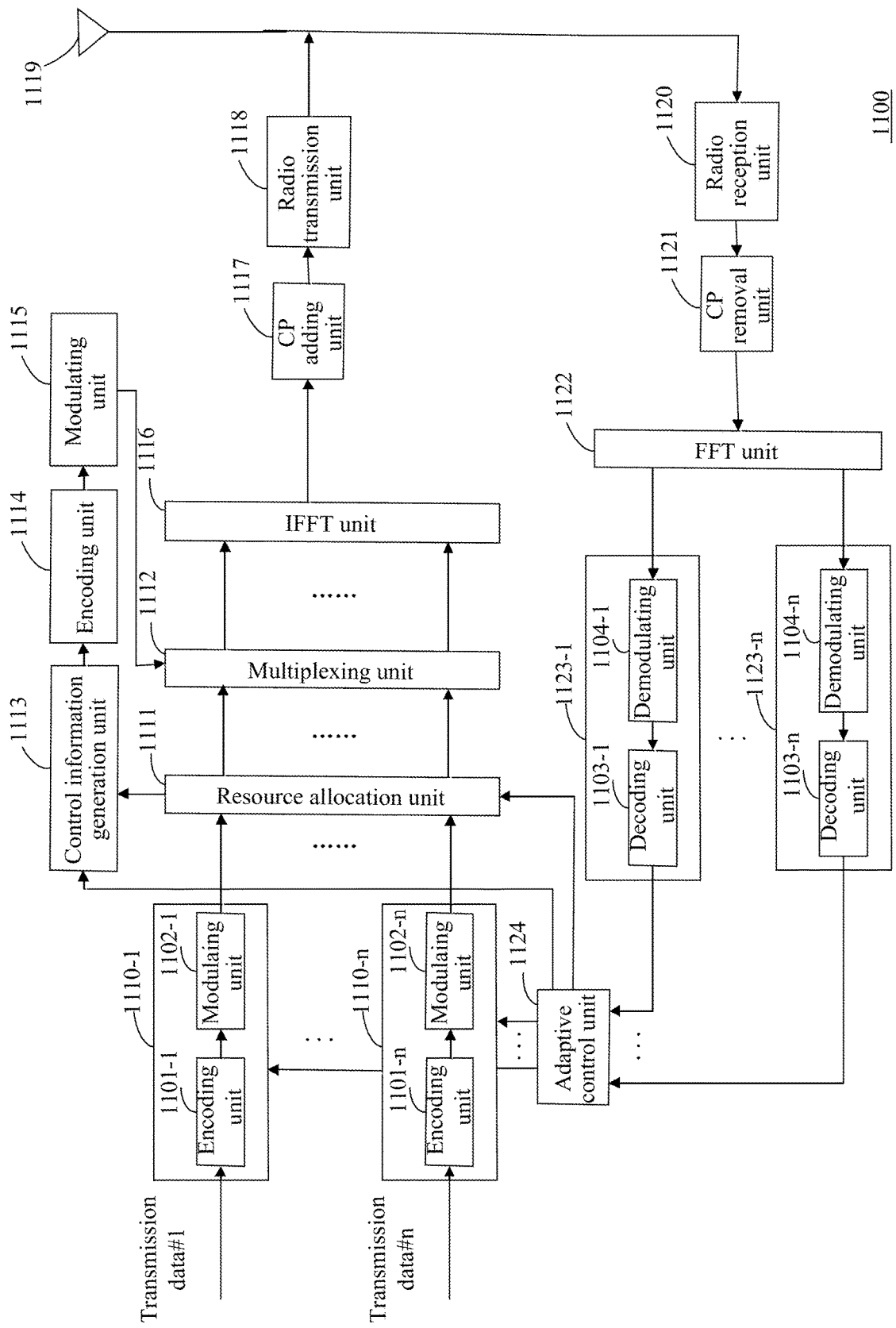
FIG. 11 illustrates a block diagram of details of a user equipment according to an embodiment of the present disclosure.

FIG. 11 illustrates a block diagram of details of a user equipment 1100 according to an embodiment of the present disclosure.

The user equipment 1100 is equipped with n encoding and modulating sections 1110-1 through 1110-$n$, each comprising an encoding unit 1101 (1101-1 through 1101-$n$) and a modulating unit 1102 (1102-1 through 1102-$n$), for transmission data #1 through transmission data #n. In the encoding and modulating sections 1110-1 through 1110-$n$, the encoding units 1101-1 through 1101-$n$ perform encoding processing on transmission data #1 through #n respectively, and the modulating units 1102-1 through 1102-$n$ perform modulation processing on post-encoding transmission data to generate a data symbol respectively. The coding rate and modulation scheme used at this time may be in accordance with MCS (Modulation and Coding Scheme) information input from an adaptive control unit 1124. The n encoding and modulating sections 1110-1 through 1110-$n$ may be considered as PUSCH.

A resource allocation unit 1111 allocates the data symbol to PRBs in accordance with control from the adaptive control unit 1124, and performs output to a multiplexing unit 1112. The resource allocation unit 1111 may also outputs resource allocation information to a control information generation unit 1113.

The control information generation unit 1113 generates control information comprising UCI and decides how to process UCI bits to be transmitted based on the information input from the adaptive control unit 1124 and the resource allocation unit 1111. More specifically, the control information generation unit 1113 drops UCI to be transmitted in a BWP switching period of a first BWP, and determines the earliest available slot of the second BWP or a third BWP as the slot for transmitting the dropped UCI. Then, the control information generation unit 1113 outputs the generated control information to an encoding unit 1114.

The encoding unit 1114 performs encoding processing on the control information (for example, UCI), and a modulating unit 1115 performs modulation processing on the post-encoding control information and outputs the control information to a multiplexing unit 1112.

The multiplexing unit 1112 multiplexes control information (for example, UCI) with data symbols input from the resource allocation unit 1111, and outputs the resulting signals to an IFFT (Inverse Fast Fourier Transform) unit 1116. Control information multiplexing is performed on a subframe-by-subframe basis, for example. It is noted that, either time domain multiplexing or frequency domain multiplexing may be used for control information multiplexing.

The IFFT unit 1116 performs IFFT processing on a plurality of subcarriers in the PRBs to which control information and a data symbol are mapped, to generate an OFDM (Orthogonal Frequency Division Multiplexing) symbol that is a multicarrier signal. A CP (Cyclic Prefix) adding unit 1117 adds a signal identical to the end part of an OFDM symbol to the start of the OFDM symbol as a CP. A radio transmission unit 1118 performs transmission processing such as D/A conversion, amplification, and up-conversion on a post-CP-addition OFDM symbol, and transmits it to a base station from an antenna 1119.

The described above corresponds to a case of the dropped UCI is multiplexed in PUSCH in the earliest available slot of the third BWP. When the dropped UCI is transmitted in PUCCH in the earliest available slot of the second BWP or the third BWP, UCI does not need to be multiplexed with data.

Meanwhile, a radio reception unit 1120 receives n OFDM symbols transmitted from a base station via the antenna 1119, and performs reception processing such as down-conversion and A/D conversion on these OFDM symbols. A CP removal unit 1121 removes a CP from a post-reception-processing OFDM symbol.

An FFT (Fast Fourier Transform) unit 1122 performs FFT processing on a post-CP-removal OFDM symbol, to obtain signals multiplexed in the frequency domain.

In demodulating and decoding sections 1123-1 through 1123-$n$, demodulating units 1104-1 through 1104-$n$ perform demodulation processing on a post-FFT signal respectively, and decoding units 1103-1 through 1103-$n$ perform decoding processing on a post-demodulation signal respectively. By this means, received data is obtained. Received control information (for example, DCI for BWP switching) within the received data is input to the adaptive control unit 1124, which performs adaptive control on transmission data based on received control information and performs frequency scheduling that decides for the resource allocation unit 1111 to which PRB each data is allocated. More specifically, UE 1100 may receive DL assignment or UL grant (as shown in FIG. 3 or FIG. 4 for example) from the base station. After being demodulated and decoded by the demodulating and decoding sections 1123-1 through 1123-$n$, DL assignment and UL grant may be provided to the adaptive control unit 1124 and then to the control information generation unit 1113 in order to generate UCI for example.

Note that, the user equipment 1100 shown in FIG. 11 may function as UE 200 as shown in FIG. 2. Specifically, the radio transmission unit 1118 may correspond to the transmitter 230. The radio reception unit 1120 may correspond to the receiver 210. The circuitry 220 may include the encoding and modulating sections 1110-1 through 1110-$n$, the resource allocation unit 1111, the multiplexing unit 1112, the control information generation unit 1113, the encoding unit 1114, the modulating unit 1115, the IFFT unit 1116, the CP adding unit 1117, the CP removal unit 1121, the FFT unit 1122, the demodulating and decoding sections 1123-1 through 1123-$n$ and the adaptive control unit 1124. Apparently, one or more of these units may also be separated from the circuitry 210 depending on specific requirements.

Figure 12:
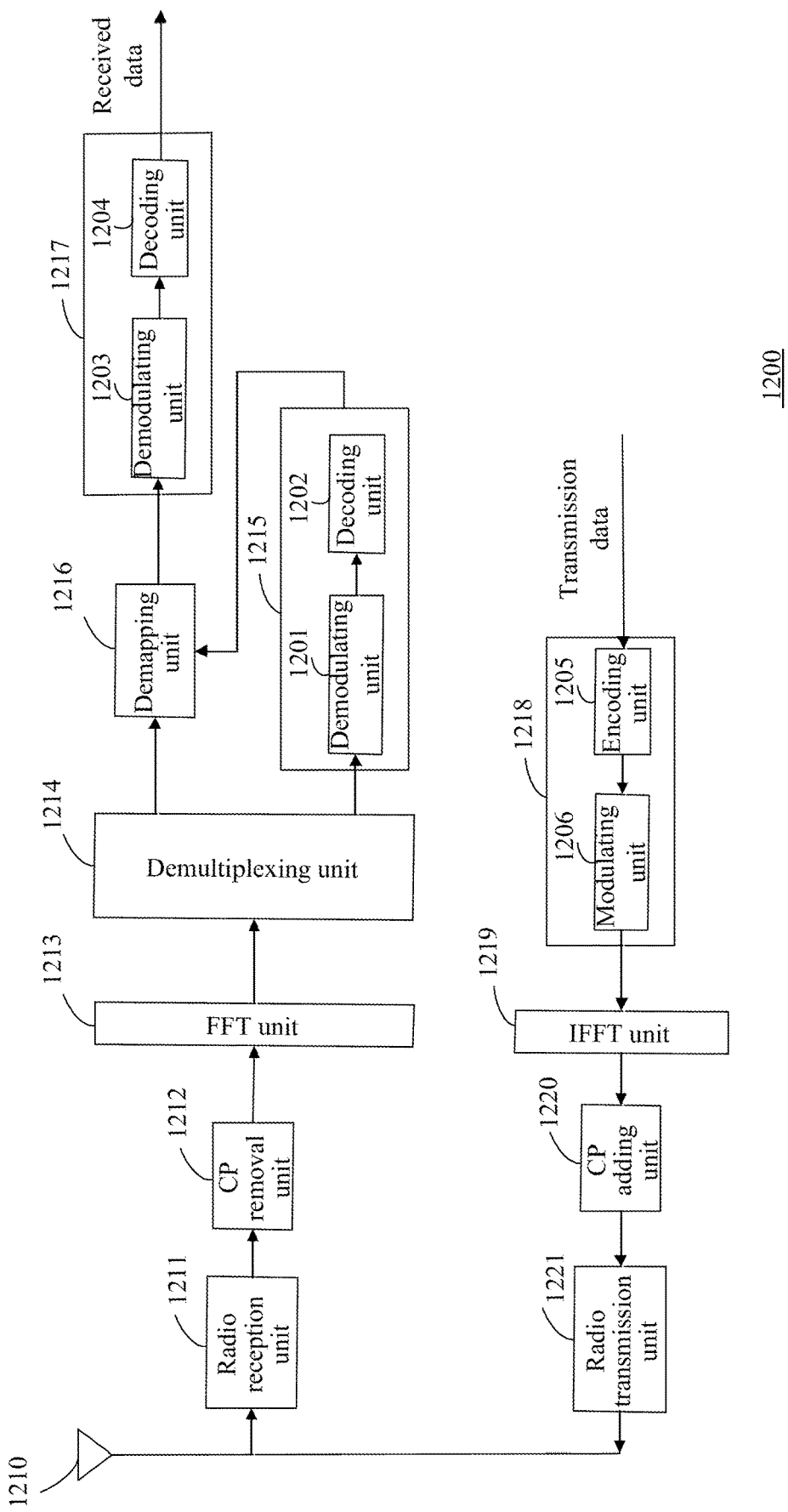
FIG. 12 illustrates a block diagram of details of a base station according to an embodiment of the present disclosure.

FIG. 12 illustrates a block diagram of details of a base station 1200 according to an embodiment of the present disclosure.

In the base station 1200 as shown in FIG. 12, a radio reception unit 1211 receives an OFDM symbol transmitted from a user equipment via an antenna 1210, and performs reception processing such as up-conversion and A/D conversion on the OFDM symbol. A CP removal unit 1212 removes a CP from a post-reception-processing OFDM symbol. An FFT unit 1213 performs FFT processing on a post-CP-removal OFDM symbol, to obtain a received signal in which control information (including UCI) and a data symbol are multiplexed. A demultiplexing unit 1214 demultiplexes a post-FFT received signal into a control signal and data symbol. Then, the demultiplexing unit 1214 outputs the control signal to a demodulating and decoding section 1215, and outputs the data symbol to a demapping unit 1216.

In the demodulating and decoding section 1215, a demodulating unit 1201 performs demodulation processing on the control signal, and a decoding unit 1202 performs decoding processing on the post-demodulation signal. Here, control information may include UCI. The demodulating and decoding section 1215 may demodulate and decode UCI bits. The UCI is originally to be transmitted in a BWP switching period of a first BWP and dropped by the user equipment, and the earliest available slot of the second BWP or the third BWP is determined by the user equipment as the slot for transmitting the dropped UCI.

In addition, the control information may also include resource allocation information. Then, the demodulating and decoding section 1215 outputs the resource allocation information within the control information to the demapping unit 1216.

Based on the resource allocation information input from the demodulating and decoding section 1215, the demapping section 1216 extracts a data symbol from PRBs based on the resource allocation information. Then, the demapping unit 1216 outputs the extracted data symbol to a demodulating and decoding section 1217.

In the demodulating and decoding section 1217, a demodulating unit 1203 performs demodulation processing on a data symbol input from the demapping unit 1216, and a decoding unit 1204 performs decoding processing on the post-demodulation signal. By this means, received data is obtained.

The described above corresponds to a case of the dropped UCI is multiplexed in PUSCH in the earliest available slot of the third BWP. When the dropped UCI is transmitted in PUCCH in the earliest available slot of the second BWP or the third BWP, UCI does not need to be multiplexed with data.

Meanwhile, in an encoding and modulating section 1218, an encoding unit 1205 performs encoding processing on transmission data, and a modulating unit 1206 performs modulation processing on post-encoding transmission data to generate a data symbol. An IFFT unit 1219 performs IFFT processing on a plurality of subcarriers in PRBs to which a data symbol input from the encoding and modulating section 1218 is allocated, to generate an OFDM symbol that is a multicarrier signal. A CP adding unit 1220 adds a signal identical to the end part of an OFDM symbol to the start of the OFDM symbol as a CP. A radio transmission unit 1221 performs transmission processing such as D/A conversion, amplification, and up-conversion on a post-CP-addition OFDM symbol, and transmits it to a user equipment from the antenna 1210.

Apparently, although not shown in FIG. 12, BS 1200 may also transmit DCI (for example, DL assignment or UL grant for BWP switching) to a user equipment by means of the encoding and modulating section 1218, the IFFT unit 1219, the CP adding unit 1220, the CP adding unit 1220 and the antenna 1210.

Note that, the base station 1200 shown in FIG. 12 may function as BS 1000 as shown in FIG. 10. Specifically, the radio reception unit 1211 may correspond to the receiver 1020. The radio transmission unit 1221 may correspond to the transmitter 1010. The circuitry 1030 may include the CP removal unit 1212, the FFT unit 1213, demultiplexing unit 1214, the demodulating and decoding sections 1215, 1217, the demapping unit 1216, the encoding and modulating section 1218, the IFFT unit 1219, the CP adding unit 1220. Apparently, one or more of these units may also be separated from the circuitry 1030 depending on specific requirements.

Figure 13:
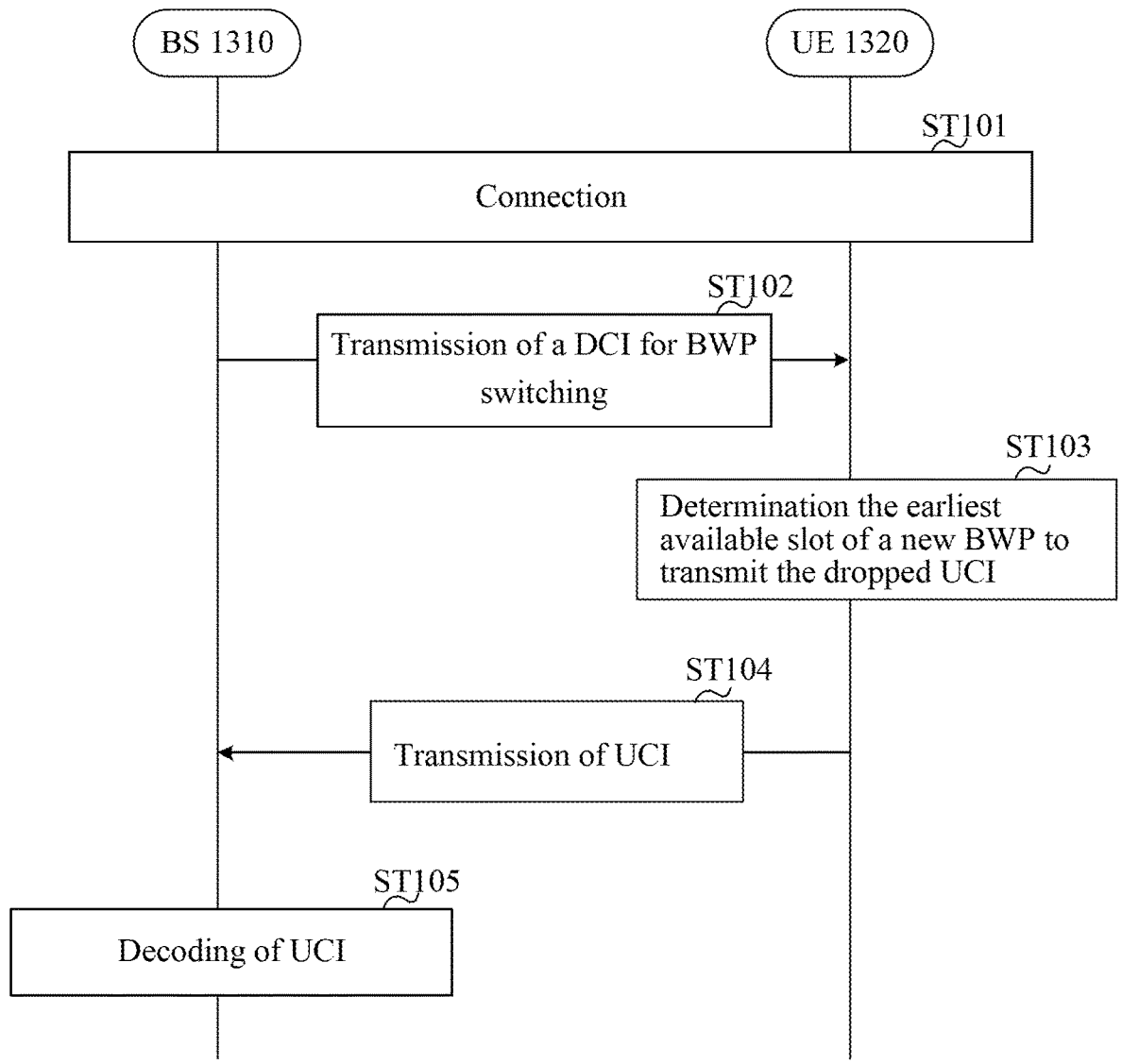
FIG. 13 schematically shows an example of a flowchart of communication between a base station and a user equipment according to an embodiment of the present disclosure.

FIG. 13 schematically shows an example of a flowchart of communication between a BS 1310 and a UE 1320 according to an embodiment of the present disclosure. For example, the BS 1310 may be the BS 1000 as shown in FIG. 10 or the base station 1200 shown in FIG. 12, and the UE 1320 may be the UE 200 as shown in FIG. 2 or the user equipment 1100 shown in FIG. 11.

At a step ST101, the UE 1320 connects with the BS 1310 in a connection procedure. The connection may be established by implementing known or future developed method whose details are omitted herein.

At a step ST102, the BS 1310 transmits a DCI for BWP switching to the UE 1320. As described above, BS 1320 may include the transmitter 1010 as the BS 1000 shown in FIG. 10, and the step ST102 may be performed by the transmitter 1010. Correspondingly, UE 1320 may include the receiver 210 as the UE 200 shown in FIG. 2, and the receiver 210 receives the DCI transmitted from the BS 1310 at the step ST102.

At a step ST 103, the UE 1320 determine the earliest available slot of a new BWP to transmit the dropped UCI. More specifically, UE 1320 drops UCI to be transmitted in a BWP switching period of the first BWP, and determines the earliest available slot of the second BWP or a third BWP as the slot for transmitting the dropped UCI. As described above, the UE 1320 may include the circuitry 220 as the UE 200 shown in FIG. 2, and the step ST103 may be performed by the circuitry 220.

At a step ST104, the UE 1320 transmits the UCI to the BS 1310. As described above, the UE 1320 may also include the transmitter 230 as the UE 200 shown in FIG. 2, and the step ST104 may be performed by the transmitter 230. Correspondingly, BS 1310 may include the receiver 1020 as the BS 1000 shown in FIG. 10, and the receiver 1020 receives UCI bits transmitted from the UE 1320 at the step ST104.

At a step ST105, the BS 1310 decodes the UCI. The BS 1310 may also include the circuitry 1030 as the BS 1000 shown in FIG. 10, and the step ST105 may be performed by the circuitry 1030.

It is noted that, although not shown in FIG. 13, data may be transmitted in PUSCH from the UE 1320 to the BS 1310 and then be decoded at the BS 1310.

Figure 14:
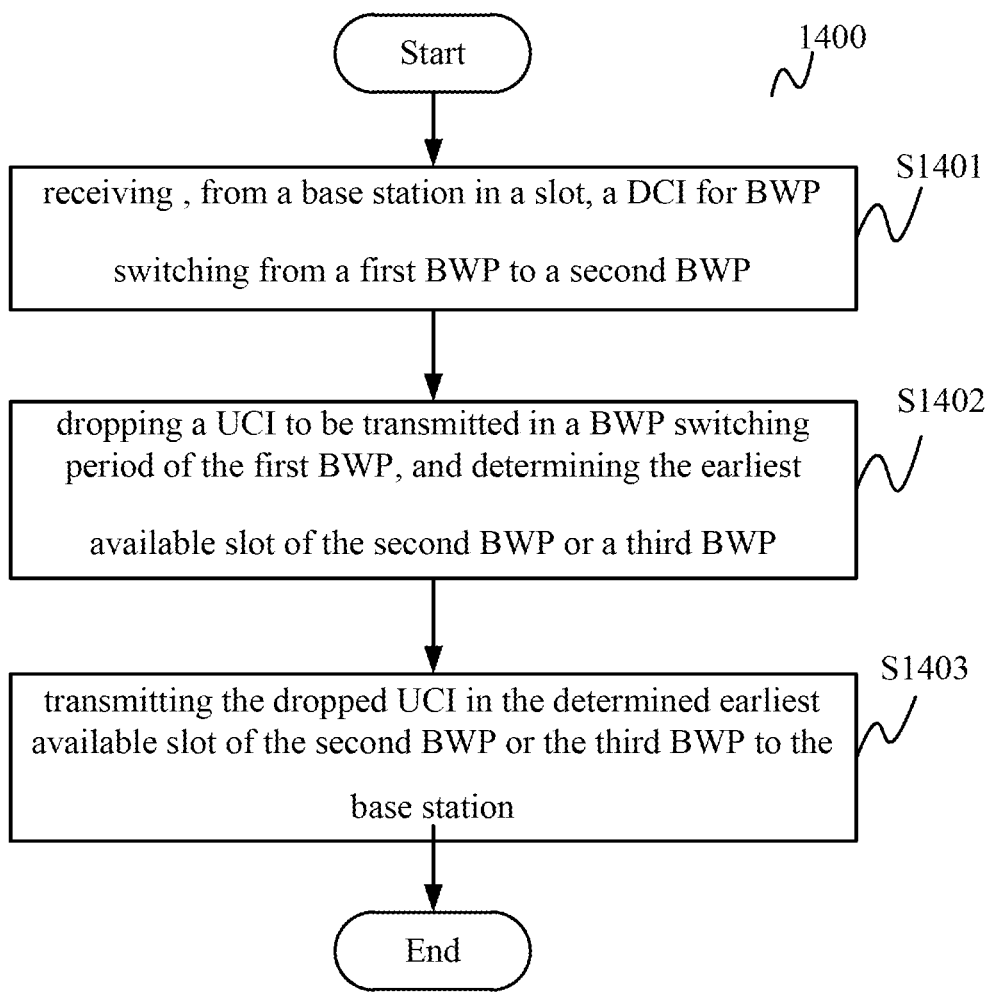
FIG. 14 illustrates a flowchart of a wireless communication method for a user equipment according to an embodiment of the present disclosure.

In a further embodiment of the present disclosure, there is provided a wireless communication method for a user equipment as shown in FIG. 14. FIG. 14 illustrates a flowchart of a wireless communication method 1400 for a user equipment according to an embodiment of the present disclosure. For example, the wireless communication method 1400 may be applied to the UE 200/1100 as shown in FIGS. 2 and 11.

As shown in FIG. 14, the wireless communication method 1400 starts at a step S1401 in which a Downlink Control Information (DCI) for Bandwidth Part (BWP) switching from a first BWP to a second BWP is received from a base station in a slot. Then, at a step S1402, a Uplink Control Information (UCI) to be transmitted in a BWP switching period of the first BWP is dropped, and the earliest available slot of the second BWP or a third BWP is determined. The BWP switching period is from the slot where the DCI for BWP switching is received until starting the second BWP to which the first BWP is switched according to the DCI. Finally, at a step S1403, the dropped UCI is transmitted in the determined earliest available slot of the second BWP or the third BWP to the base station. After the step S1403, the wireless communication method 1400 is ended. For example, the base station may be BS 1000/1200 as shown in FIGS. 10 and 12.

With the wireless communication method 1400, by using the earliest available slot of a new BWP, which is different from the original BWP, to transmit the dropped UCI which is originally to be transmitted on the original BWP in case of BWP switching, the feedback latency may be reduced and the system performance may be improved.

Note that, the other technical features in the user equipment 200 as described above can also be incorporated in the wireless communication method 1400 and will not be described here for avoiding redundancy.

Figure 15:
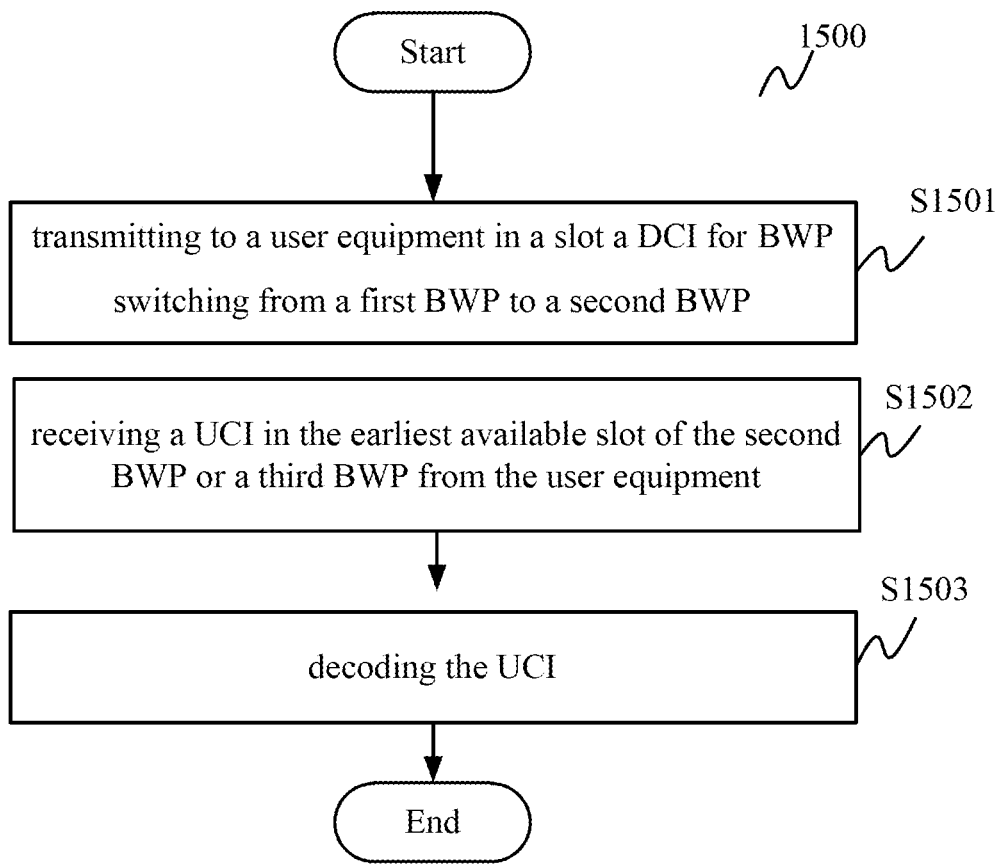
FIG. 15 illustrates a flowchart of a wireless communication method for a base station according to an embodiment of the present disclosure.

In a further embodiment of the present disclosure, there is provided a wireless communication method for a base station as shown in FIG. 15. FIG. 15 illustrates a flowchart of a wireless communication method 1500 for a base station according to an embodiment of the present disclosure. For example, the wireless communication method 1500 may be applied to the BS 1000/1200 as shown in FIGS. 10 and 12.

As shown in FIG. 15, the wireless communication method 1500 starts at a step S1501 in which a Downlink Control Information (DCI) for Bandwidth Part (BWP) switching from a first BWP to a second BWP is transmitted to a user equipment in a slot. Then, at a step S1502, a Uplink Control Information (UCI) is received in the earliest available slot of the second BWP or a third BWP from the user equipment. Finally, at a step S1503, the UCI is decoded. After the step S1503, the wireless communication method 1500 is ended. The UCI to be transmitted in a BWP switching period of the first BWP is dropped by the user equipment, and the earliest available slot of the second or the third BWP is determined by the user equipment. The BWP switching period is from the slot where the DCI for BWP switching is received by the user equipment until starting the second BWP to which the first BWP is switched according to the DCI. For example, the user equipment may be the UE 200/1100 as shown in FIGS. 2 and 11.

With the wireless communication method 1500, by using the earliest available slot of a new BWP, which is different from the original BWP, to transmit the dropped UCI which is originally to be transmitted on the original BWP in case of BWP switching, the feedback latency may be reduced and the system performance may be improved.

Note that, the other technical features in the base station 1000 as described above can also be incorporated in the wireless communication method 1500 and will not be described here for avoiding redundancy.

The present disclosure can be realized by software, hardware, or software in cooperation with hardware. Each functional block used in the description of each embodiment described above can be realized by an LSI as an integrated circuit, and each process described in the each embodiment may be controlled by LSI. They may be individually formed as chips, or one chip may be formed so as to include a part or all of the functional blocks. They may include a data input and output coupled thereto. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used.

It is noted that the present disclosure intends to be variously changed or modified by those skilled in the art based on the description presented in the specification and known technologies without departing from the content and the scope of the present disclosure, and such changes and applications fall within the scope that claimed to be protected. Furthermore, in a range not departing from the content of the disclosure, the constituent elements of the above-described embodiments may be arbitrarily combined.

Embodiments of the present disclosure can at least provide the following subject matters.

(1). A user equipment, comprising:
a receiver operative to receive, from a base station in a slot, a Downlink Control Information (DCI) for Bandwidth Part (BWP) switching from a first BWP to a second BWP;
circuitry operative to drop a Uplink Control Information (UCI) to be transmitted in a BWP switching period of the first BWP, and to determine the earliest available slot of the second BWP or a third BWP, the BWP switching period being from the slot where the DCI for BWP switching is received until starting the second BWP to which the first BWP is switched according to the DCI; and
a transmitter operative to transmit the dropped UCI in the determined earliest available slot of the second BWP or the third BWP to the base station.

(2). The user equipment according to (1), wherein the earliest available slot of the second BWP or the third BWP is specified in standard, or indicated by slot format indicator (SFI) and/or configured by Radio Resource Control (RRC).

(3). The user equipment according to (1), wherein the dropped UCI is transmitted in Physical Uplink Control Channel (PUCCH) in the earliest available slot of the second BWP or the third BWP, or transmitted by multiplexing in Physical Uplink Shared Channel (PUSCH) in the earliest available slot of the second BWP or the third BWP.

(4). The user equipment according to (3), wherein the PUCCH resource position for transmitting the dropped UCI in the earliest available slot of the second BWP or the third BWP is determined according to one or more of RRC configuration, specification in the standard, implicit indication by Control Chanel Element (CCE) index of Physical Downlink Control Channel (PDCCH), explicit indication by Hybrid Automatic Repeat request-Acknowledgement (HARQ-ACK) resource indicator (ARI) in DCI, and UE ID.

(5). The user equipment according to (3), wherein resource position for UCI multiplexed in PUSCH is specified in the standard.

(6). The user equipment according to (1), wherein the DCI is for Downlink (DL) assignment or for Uplink (UL) grant.

(7). The user equipment according to (1), wherein the DCI for BWP switching is received on the first BWP.

(8). The user equipment according to (1), wherein the DCI for BWP switching is received on a fourth BWP, and the first BWP and the fourth BWP correspond to same slots.

(9). The user equipment according to (1), wherein the first BWP is in a first carrier and the third BWP is in a second carrier, and the first BWP and the third BWP correspond to same slots.

(10). The user equipment according to (9), wherein there is no DCI for BWP switching received on the third BWP, and/or one of the first BWP and the third BWP is used for Scell and the other thereof is used for Pcell or a configured cell, and/or the cell for which one of the first BWP and the third BWP is used is Supplementary UL (SUL).

(11). The user equipment according to (1), wherein all of slots in the BWP switching period are used for BWP switching.

(12). The user equipment according to (1), wherein UCI to be transmitted in a slot not used for BWP switching in the BWP switching period is not dropped by the user equipment, and wherein the number of slots used for BWP switching in the BWP switching period is specified in the standard or configured based on the user equipment's capability of BWP switching.

(13). The user equipment according to (1), wherein the semi-static codebook size is determined for the earliest available slot of the second BWP or the third BWP by taking into consideration of the dropped UCI.

(14). The user equipment according to (1), wherein UCI comprises HARQ-ACK and/or Channel State Information (CSI).

(15). A base station, comprising:

a transmitter operative to transmit to a user equipment in a slot a Downlink Control Information (DCI) for Bandwidth Part (BWP) switching from a first BWP to a second BWP;

a receiver operative to receive a Uplink Control Information (UCI) in the earliest available slot of the second BWP or a third BWP from the user equipment; and circuitry operative to decode the UCI, wherein the UCI to be transmitted in a BWP switching period of the first BWP is dropped by the user equipment, and the earliest available slot of the second or the third BWP is determined by the user equipment, the BWP switching period being from the slot where the DCI for BWP switching is received by the user equipment until starting the second BWP to which the first BWP is switched according to the DCI.

(16). The base station according to (15), wherein the earliest available slot of the second BWP or the third BWP is specified in standard, or indicated by slot format indicator (SFI) and/or configured by Radio Resource Control (RRC).

(17). The base station according to (15), wherein the dropped UCI is transmitted in Physical Uplink Control Channel (PUCCH) in the earliest available slot of the second BWP or the third BWP, or transmitted by multiplexing in Physical Uplink Shared Channel (PUSCH) in the earliest available slot of the second BWP or the third BWP.

(18). The base station according to (17), wherein the PUCCH resource position for transmitting the dropped UCI in the earliest available slot of the second BWP or the third BWP is determined according to one or more of RRC configuration, specification in the standard, implicit indication by Control Chanel Element (CCE) index of Physical Downlink Control Channel (PDCCH), explicit indication by Hybrid Automatic Repeat request-Acknowledgement (HARQ-ACK) resource indicator (ARI) in DCI, and UE ID.

(19). The base station according to (17), wherein resource position for UCI multiplexed in PUSCH is specified in the standard.

(20). The base station according to (15), wherein the DCI is for Downlink (DL) assignment or for Uplink (UL) grant.

(21). The base station according to (15), wherein the DCI for BWP switching is received on the first BWP.

(22). The base station according to (15), wherein the DCI for BWP switching is transmitted on a fourth BWP, and the first BWP and the fourth BWP correspond to same slots.

(23). The base station according to (15), wherein the first BWP is in a first carrier and the third BWP is in a second carrier, and the first BWP and the third BWP correspond to same slots.

(24). The base station according to (23), wherein there is no DCI for BWP switching received on the third BWP, and/or one of the first BWP and the third BWP is used for Scell and the other thereof is used for Pcell or a configured cell, and/or the cell for which one of the first BWP and the third BWP is used is Supplementary UL (SUL).

(25). The base station according to (15), wherein all of slots in the BWP switching period are used for BWP switching.

(26). The base station according to (15), wherein UCI to be transmitted in a slot not used for BWP switching in the BWP switching period is not dropped by the user equipment, and wherein the number of slots used for BWP switching in the BWP switching period is specified in the standard or configured based on the user equipment's capability of BWP switching.

(27). The base station according to (15), wherein the semi-static codebook size is determined for the earliest available slot of the second BWP or the third BWP by taking into consideration of the dropped UCI.

(28). The base station according to (15), wherein UCI comprises HARQ-ACK and/or Channel State Information (CSI).

(29). A wireless communication method for a user equipment, comprising:

receiving, from a base station in a slot, a Downlink Control Information (DCI) for Bandwidth Part (BWP) switching from a first BWP to a second BWP;

dropping a Uplink Control Information (UCI) to be transmitted in a BWP switching period of the first BWP, and determining the earliest available slot of the second BWP or a third BWP, the BWP switching period being from the slot where the DCI for BWP switching is received until starting the second BWP to which the first BWP is switched according to the DCI; and transmitting the dropped UCI in the determined earliest available slot of the second BWP or the third BWP to the base station.

(30). The wireless communication method according to (29), wherein the earliest available slot of the second BWP or the third BWP is specified in standard, or indicated by slot format indicator (SFI) and/or configured by Radio Resource Control (RRC).

(31). The wireless communication method according to (29), wherein the dropped UCI is transmitted in Physical Uplink Control Channel (PUCCH) in the earliest available slot of the second BWP or the third BWP, or transmitted by multiplexing in Physical Uplink Shared Channel (PUSCH) in the earliest available slot of the second BWP or the third BWP.

(32). The wireless communication method according to (31), wherein the PUCCH resource position for transmitting the dropped UCI in the earliest available slot of the second BWP or the third BWP is determined according to one or more of RRC configuration, specification in the standard, implicit indication by Control Chanel Element (CCE) index of Physical Downlink Control Channel (PDCCH), explicit indication by Hybrid Automatic Repeat request-Acknowledgement (HARQ-ACK) resource indicator (ARI) in DCI, and UE ID.

(33). The wireless communication method according to (31), wherein resource position for UCI multiplexed in PUSCH is specified in the standard.

(34). The wireless communication method according to (29), wherein the DCI is for Downlink (DL) assignment or for Uplink (UL) grant.

(35). The wireless communication method according to (29), wherein the DCI for BWP switching is received on the first BWP.

(36). The wireless communication method according to (29), wherein the DCI for BWP switching is received on a fourth BWP, and the first BWP and the fourth BWP correspond to same slots.

(37). The wireless communication method according to (29), wherein the first BWP is in a first carrier and the third BWP is in a second carrier, and the first BWP and the third BWP correspond to same slots.

(38). The wireless communication method according to (37), wherein there is no DCI for BWP switching received on the third BWP, and/or one of the first BWP and the third BWP is used for Scell and the other thereof is used for Pcell or a configured cell, and/or the cell for which one of the first BWP and the third BWP is used is Supplementary UL (SUL).

(39). The wireless communication method according to (29), wherein all of slots in the BWP switching period are used for BWP switching.

(40). The wireless communication method according to (29), wherein UCI to be transmitted in a slot not used for BWP switching in the BWP switching period is not dropped by the user equipment, and
wherein the number of slots used for BWP switching in the BWP switching period is specified in the standard or configured based on the user equipment's capability of BWP switching.

(41). The wireless communication method according to (29), wherein the semi-static codebook size is determined for the earliest available slot of the second BWP or the third BWP by taking into consideration of the dropped UCI.

(42). The wireless communication method according to (29), wherein UCI comprises HARQ-ACK and/or Channel State Information (CSI).

(43). A wireless communication method for a base station, comprising:
transmitting to a user equipment in a slot a Downlink Control Information (DCI) for Bandwidth Part (BWP) switching from a first BWP to a second BWP;
receiving a Uplink Control Information (UCI) in the earliest available slot of the second BWP or a third BWP from the user equipment; and
decoding the UCI,
wherein the UCI to be transmitted in a BWP switching period of the first BWP is dropped by the user equipment, and the earliest available slot of the second or the third BWP is determined by the user equipment, the BWP switching period being from the slot where the DCI for BWP switching is received by the user equipment until starting the second BWP to which the first BWP is switched according to the DCI.

(44). The wireless communication method according to (43), wherein the earliest available slot of the second BWP or the third BWP is specified in standard, or indicated by slot format indicator (SFI) and/or configured by Radio Resource Control (RRC).

(45). The wireless communication method according to (43), wherein the dropped UCI is transmitted in Physical Uplink Control Channel (PUCCH) in the earliest available slot of the second BWP or the third BWP, or transmitted by multiplexing in Physical Uplink Shared Channel (PUSCH) in the earliest available slot of the second BWP or the third BWP.

(46). The wireless communication method according to (45), wherein the PUCCH resource position for transmitting the dropped UCI in the earliest available slot of the second BWP or the third BWP is determined according to one or more of RRC configuration, specification in the standard, implicit indication by Control Chanel Element (CCE) index of Physical Downlink Control Channel (PDCCH), explicit indication by Hybrid Automatic Repeat request-Acknowledgement (HARQ-ACK) resource indicator (ARI) in DCI, and UE ID.

(47). The wireless communication method according to (45), wherein resource position for UCI multiplexed in PUSCH is specified in the standard.

(48). The wireless communication method according to (43), wherein the DCI is for Downlink (DL) assignment or for Uplink (UL) grant.

(49). The wireless communication method according to (43), wherein the DCI for BWP switching is transmitted on the first BWP.

(50). The wireless communication method according to (43), wherein the DCI for BWP switching is received on a fourth BWP, and the first BWP and the fourth BWP correspond to same slots.

(51). The wireless communication method according to (43), wherein the first BWP is in a first carrier and the third BWP is in a second carrier, and the first BWP and the third BWP correspond to same slots.

(52). The wireless communication method according to (51), wherein there is no DCI for BWP switching received on the third BWP, and/or one of the first BWP and the third BWP is used for Scell and the other thereof is used for Pcell or a configured cell, and/or the cell for which one of the first BWP and the third BWP is used is Supplementary UL (SUL).

(53). The wireless communication method according to (43), wherein all of slots in the BWP switching period are used for BWP switching.

(54). The wireless communication method according to (43), wherein UCI to be transmitted in a slot not used for BWP switching in the BWP switching period is not dropped by the user equipment, and
wherein the number of slots used for BWP switching in the BWP switching period is specified in the standard or configured based on the user equipment's capability of BWP switching.

(55). The wireless communication method according to (43), wherein the semi-static codebook size is determined for the earliest available slot of the second BWP or the third BWP by taking into consideration of the dropped UCI.

(56). The wireless communication method according to (43), wherein UCI comprises HARQ-ACK and/or Channel State Information (CSI).

The invention claimed is:

1. A user equipment, comprising:
a receiver operative to receive, from a base station in a slot, a Downlink Control Information (DCI) for Bandwidth Part (BWP) switching from a first BWP to a second BWP;
circuitry operative to drop a Uplink Control Information (UCI) to be transmitted in a BWP switching period, and to determine an available slot of a third BWP that is different from the second BWP, the BWP switching period being from the slot where the DCI for BWP switching is received until starting the second BWP to which the first BWP is switched according to the DCI; and
a transmitter operative to transmit the dropped UCI in the determined available slot of the third BWP to the base station.

2. The user equipment according to claim 1, wherein the available slot of the third BWP is specified in standard, or indicated by slot format indicator (SFI) and/or configured by Radio Resource Control (RRC).

3. The user equipment according to claim 1, wherein the dropped UCI is transmitted in Physical Uplink Control Channel (PUCCH) in the available slot of the third BWP, or transmitted by multiplexing in Physical Uplink Shared Channel (PUSCH) in the available slot of the third BWP.

4. The user equipment according to claim 3, wherein the PUCCH resource position for transmitting the dropped UCI in the available slot of the third BWP is determined according to one or more of RRC configuration, specification in the standard, implicit indication by Control Chanel Element (CCE) index of Physical Downlink Control Channel (PDCCH), explicit indication by Hybrid Automatic Repeat request-Acknowledgement (HARQ-ACK) resource indicator (ARI) in DCI, and UE ID.

5. The user equipment according to claim 1, wherein the DCI is for Downlink (DL) assignment or for Uplink (UL) grant.

6. The user equipment according to claim 1, wherein the DCI for BWP switching is received on the first BWP.

7. The user equipment according to claim 1, wherein the DCI for BWP switching is received on a fourth BWP, and the first BWP and the fourth BWP correspond to same slots.

8. The user equipment according to claim 1, wherein the first BWP is in a first carrier and the third BWP is in a second carrier, and the first BWP and the third BWP correspond to same slots.

9. The user equipment according to claim 8, wherein there is no DCI for BWP switching received on the third BWP, and/or one of the first BWP and the third BWP is used for Scell and the other thereof is used for Pcell or a configured cell, and/or the cell for which one of the first BWP and the third BWP is used is Supplementary UL (SUL).

10. The user equipment according to claim 1, wherein all of slots in the BWP switching period are used for BWP switching.

11. The user equipment according to claim 1, wherein UCI to be transmitted in a slot not used for BWP switching in the BWP switching period is not dropped by the user equipment, and
wherein the number of slots used for BWP switching in the BWP switching period is specified in the standard or configured based on the user equipment's capability of BWP switching.

12. A wireless communication method for a user equipment, comprising:
receiving, from a base station in a slot, a Downlink Control Information (DCI) for Bandwidth Part (BWP) switching from a first BWP to a second BWP;
dropping a Uplink Control Information (UCI) to be transmitted in a BWP switching period, and determining an available slot of a third BWP that is different from the second BWP, the BWP switching period being from the slot where the DCI for BWP switching is received until starting the second BWP to which the first BWP is switched according to the DCI; and
transmitting the dropped UCI in the determined available slot of the third BWP to the base station.

* * * * *